United States Patent
Kang et al.

(10) Patent No.: US 11,206,517 B2
(45) Date of Patent: Dec. 21, 2021

(54) APPARATUS AND METHOD FOR ASSISTING SIDELINK RESOURCE CONFIGURATION AND ALLOCATION FOR DIRECT COMMUNICATION IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 16/831,480

(22) Filed: Mar. 26, 2020

(65) Prior Publication Data
US 2020/0314612 A1    Oct. 1, 2020

(30) Foreign Application Priority Data

Mar. 26, 2019   (KR) .................. 10-2019-0034059
Feb. 18, 2020   (KR) .................. 10-2020-0019957

(51) Int. Cl.
*H04W 4/40*        (2018.01)
*H04W 76/14*       (2018.01)
(Continued)

(52) U.S. Cl.
CPC .............. *H04W 4/40* (2018.02); *H04W 8/005* (2013.01); *H04W 8/24* (2013.01);
(Continued)

(58) Field of Classification Search
CPC ......... H04M 1/72406; H04L 29/08648; H04L 29/0899; H04L 41/5058; H04W 4/40–48;
(Continued)

(56) References Cited

U.S. PATENT DOCUMENTS 9,949,246 B2    4/2018 Li et al.
2019/0174530 A1 6/2019 Kim et al.
(Continued)

FOREIGN PATENT DOCUMENTS

WO    2018004322 A1    1/2018

OTHER PUBLICATIONS

CATT, "Mode 2(d) Resource Allocation," R2-1900147, 3GPP TSG-RAN WG2 Meeting #105, Athens, Greece, Feb. 25-Mar. 1, 2019, 3 pages.
(Continued)

*Primary Examiner* — Thomas R Cairns

(57) ABSTRACT

The present disclosure relates to a communication method and system for converging a $5^{th}$-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. An operation method of a terminal in a wireless communication system may include activating sidelink mode-2 (d) and obtaining sidelink radio resource configuration information of other terminals and transmitting the obtained sidelink radio resource configuration information to a target terminal. An operation method of a terminal in a wireless communication system may include activating sidelink mode-2 (d) and receiving sidelink radio resource configuration information from other terminals and allocating sidelink radio resource to a base station or the terminal itself using the received sidelink radio resource configuration information.

14 Claims, 22 Drawing Sheets

(51) Int. Cl.
H04W 8/00 (2009.01)
H04W 72/04 (2009.01)
H04W 8/24 (2009.01)
H04W 92/18 (2009.01)

(52) U.S. Cl.
CPC ....... H04W 72/0406 (2013.01); H04W 76/14 (2018.02); H04W 92/18 (2013.01)

(58) Field of Classification Search
CPC ......... H04W 4/70; H04W 8/005; H04W 8/20; H04W 8/24–245; H04W 36/0072; H04W 36/03; H04W 40/24; H04W 48/16; H04W 60/06; H04W 72/0406–0433; H04W 76/14; H04W 84/18; H04W 92/18
See application file for complete search history.

(56) References Cited

U.S. PATENT DOCUMENTS

2020/0245408 A1\* 7/2020 Zhao ................. H04W 72/0406
2020/0267799 A1\* 8/2020 Lee ........................ H04W 88/04
2021/0219268 A1\* 7/2021 Li .......................... H04W 80/02

OTHER PUBLICATIONS

LG Electronics Inc. (Rapporteur), "Report of [104#59][NR/V2X] Resource allocation," R2-1902159, 3GPP TSG-RAN WG2 Meeting #105, Athens, Greece, Feb. 25-Mar. 1, 2018, 38 pages.
MediaTek Inc., "UE-assisted resource allocation for NR V2X," R2-1900815 (revision of R2-1816820), 3GPP TSG-RAN WG2 Meeting #105, Athens, Greece, Feb. 25-Mar. 1, 2019, 5 pages.
International Search Report and Written Opinion of the International Searching Authority in connection with International Application No. PCT/KR2020/004142 dated Jul. 6, 2020, 7 pages.
3GPP TR 38.885 V1.0.0 (Nov. 2018), Technical Report, 3rd Generation Partnership Project; Technical Specification Group Radio Access Network; NR; Study on Vehicle-to-Everything (Release 16), 23 pages.

\* cited by examiner

APPARATUS AND METHOD FOR ASSISTING SIDELINK RESOURCE CONFIGURATION AND ALLOCATION FOR DIRECT COMMUNICATION IN WIRELESS COMMUNICATION SYSTEM

CROSS-REFERENCE TO RELATED APPLICATIONS

This application is based on and claims priority under 35 U.S.C. 119 to Korean Patent Application Nos. 10-2019-0034059 & 10-2020-0019957, filed on Mar. 26, 2019 & Feb. 18, 2020, in the Korean Intellectual Property Office, the disclosure of which is herein incorporated by reference in their entireties.

BACKGROUND

1. Field

The disclosure generally relates to a wireless communication system and, more particularly, to an apparatus and a method for supporting resource allocation requires for data transmission of a direct communication bearer in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In a 5G system, wireless interface schemes for providing services with various quality of service (QoS) requirements have been discussed. For example, a direct communication scheme for a vehicle-to-everything (V2X) terminal has been provided. Furthermore, various discussions are underway to shorten communication time, increase reliability, and support direct communication between terminals more efficiently. Vehicle-to-everything (V2X) is a general term that refers to all forms of communication that can be applied to road vehicles, and it is becoming available with various additional services in addition to the initial safety use case by combining with wireless communication technology.

The above information is presented as background information only to assist with an understanding of the disclosure. No determination has been made, and no assertion is made, as to whether any of the above might be applicable as prior art with regard to the disclosure.

SUMMARY

Based on the discussion as described above, the disclosure provides a method for performing communication in a vehicle communication system in a direct communication system between terminals, and provides an apparatus and a method for supporting a vehicle communication service and data transmission that achieve high reliability and low latency requirements.

The technical subjects pursued in the disclosure may not be limited to the aforementioned technical subjects, and other technical subjects which are not mentioned may be clearly understood, through the following descriptions, by those skilled in the art to which the disclosure pertains.

According to an embodiment of the disclosure for solving the above problems, a method of a terminal in a wireless communication system may include: determining, based on at least one predetermined condition, whether a mode-2 (d) sidelink wireless communication has been configured; if the mode-2 (d) sidelink wireless communication has been configured, determining whether an assistant terminal function has been activated; if the assistant terminal function has been activated, identifying at least one target terminal; and receiving information on the mode-2 (d) sidelink wireless communication from the identified target terminal.

Meanwhile, according to another embodiment of the disclosure, a terminal in a wireless communication system may include a transceiver, and a controller for controlling the transceiver to: based on the transceiver and at least one predetermined condition, determine whether the mode-2 (d) sidelink wireless communication has been configured; if the mode 2-(d) sidelink wireless communication has been configured, determine whether the assistant terminal function has been activated; if the assistant terminal function has been activated, identifying the at least one target terminal, and receive information on the mode-2 (d) sidelink wireless communication from the identified target terminal.

An apparatus and a method according to various embodiments of the disclosure provide a method capable of supporting a vehicle communication service requiring various quality of service (QoS) using direct communication between terminals in a vehicle communications system, and provide a method of reducing delay until direct communication resource acquisition by reducing uplink and downlink signaling required for acquiring direct communication resources between a plurality of terminals and a base station and reducing uplink and downlink signaling, so that reliability and low latency requirements in vehicle communication can be achieved.

Effects obtained in the disclosure are not limited to the above-mentioned effects, and other effects not mentioned above may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
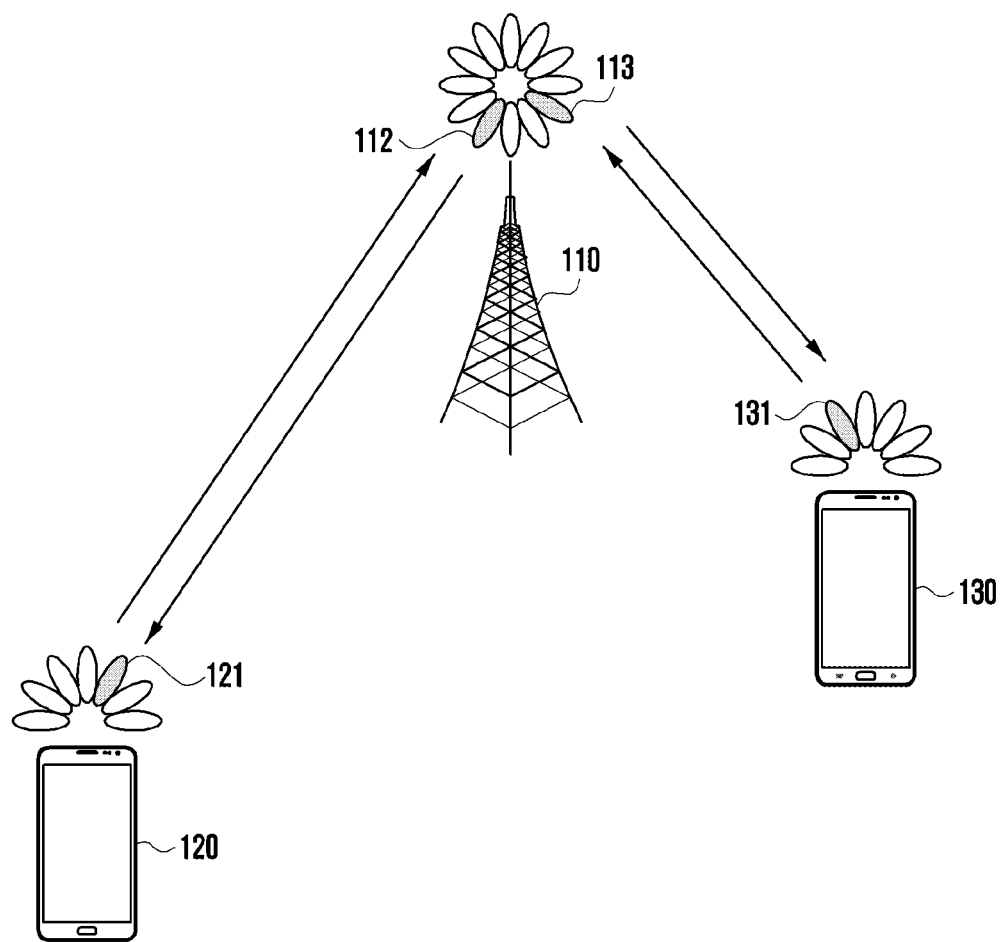
FIG. 1 illustrates a wireless communication system according to various embodiments of the present disclosure.

FIGS. 1 through 10B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments and are not intended to limit the disclosure. A singular expression may include a plural expression unless the terms are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to an apparatus and a method for allocating and/or acquiring sidelink radio resources to support a vehicle-to-everything (V2X) service in a wireless communication system using a direct communication protocol between terminals. Specifically, the disclosure explains a technology capable of satisfying QoS level required for various V2X services, based on an operation procedure of a terminal assisting in configuring a sidelink radio resource for sidelink direct communication between V2X terminals in a wireless communication system.

In the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

Further, various embodiments on the disclosure will be described using terms defined in specific communication standards (e.g., 3rd generation partnership project (3GPP)) for the convenience of description. However, the various embodiments are used by way of example merely to explain the disclosure, and the disclosure may be easily modified and applied to other systems.

According to various embodiments of the disclosure, an operation method of a terminal in a wireless communication system may include: determining service information requiring mode-2 (d) based sidelink direct communication, determining terminal capability capable of assisting the mode-2 (d) based sidelink direct communication, notifying a base station or another terminal of the capability of an assistant terminal of the mode-2 (d) based sidelink direct communication, searching for a terminal assisting the mode-2 (d) based sidelink direct communication, obtaining assistant terminal information of the mode-2 (d) based sidelink direct communication, obtaining peripheral terminal information requiring the mode-2 (d) based sidelink direct communication, transmitting information of a terminal requiring the mode-2 (d) based sidelink direct communication to a base station, obtaining resource information necessary for the mode-2 (d) based sidelink direct communication from a base station, transmitting resource information necessary for the mode-2 (d) based sidelink direct communication to a neighboring terminal, obtaining resource information necessary for the mode-2 (d) based sidelink direct communication from the assistant terminal, requesting resource allocation from a base station from resource information necessary for the acquired mode-2 (d) based sidelink direct communication, and obtaining a resource from resource information necessary for the acquired mode-2 (d) based sidelink direct communication.

According to various embodiments of the disclosure, a terminal device in a wireless communication system may include a transceiver, and at least one processor functionally coupled with the transceiver. The at least one processor, when it is determined that the terminal is an assistant terminal of the mode-2 (d) based sidelink direct communication, may acquire information of another terminal requiring the mode-2 (d) based sidelink direct communication, request the base station for resource information required for sidelink direct communication of another terminal, and obtain resource information for sidelink direct communication of another terminal from the base station. The at least one process, when the terminal requires mode-2 (d) based sidelink direct communication and is not an assistant terminal of the mode-2 (d) based sidelink direct communication, may obtain assistant terminal information of the mode-2 (d) based sidelink direct communication, transmit information necessary for the sidelink direct communication to the assistant terminal of the mode-2 (d) based sidelink direct communication, and obtain resource information necessary for the sidelink direct communication through the assistant terminal.

The assistant terminal (assistant UE) may be used interchangeably with terms such as a coordinator UE, a scheduling UE, a mode-2 (d) UE, a relaying UE and the like.

Hereinafter, various embodiments of the disclosure will be described in detail.

FIG. 1 illustrates a wireless communication system according to various embodiments of the present disclosure.

FIG. 1 illustrates a base station 110, a terminal 1 120, and a terminal 2 130 as parts of nodes using a wireless channel in a wireless communication system. Although FIG. 1 illustrates only one base station, another base station identical or similar to the base station 110 may be further included. Although FIG. 1 illustrates only two terminals, another terminal identical or similar to the terminal 1 120 and the terminal 2 130 may be further included.

The base station 110 is a network infrastructure for providing a radio access to the terminals 120 and 130. The base station 110 has a coverage defined as a certain geographic area, based on the distance over which a signal can be transmitted. The base station 110 may be referred to as an "access point (AP)," an "eNodeB (eNB)," a "5th generation node (5G node)," a "5GNodeB (gNB)," a "wireless point," "transmission/reception point (TRP)," or another term having an equivalent technical meaning in addition to the base station.

Each of the terminal 1 120 and the terminal 2 130 is a device used by a user and performs communication with the base station 110 via a wireless channel. In some embodiments, at least one of the terminal 1 120 and the terminal 2 130 may be operated without user's involvement. That is, at least one of the terminal 1 120 and the terminal 2 130 is a device for performing machine type communication (MTC) and may not be carried by the user. Each of the terminal 1 120 and the terminal 2 130 may be referred to as a "user equipment (UE), "a mobile station", a "subscriber station", a "remote terminal", a "wireless terminal", or a "user device" or another term having an equivalent technical meaning in addition to the terminal.

The base station 110, the terminal 1 120 and the terminal 2 130 may transmit and receive a wireless signal in a sub 6 MHz bandwidth and millimeter wave (mmWave) bandwidth (e.g., 28 GHz, 30 GHz, 38 GHz, 60 GHz). In this case, in order to improve the channel gain, the base station 110, the terminal 1 120 and the terminal 2 130 may perform beamforming. Here, the beamforming may include transmission beamforming and reception beamforming. That is, the base station 110, the terminal 1 120 and the terminal 2 130 may give directivity to a transmission signal or a reception signal. To this end, the base station 110, the terminal 1 120 and the terminal 2 130 may select serving beams 112, 113, 121 and 131 via a procedure of beam search or beam management. After the serving beams 112, 113, 121 and 131 are selected, the subsequent communication may be performed via a resource in quasi-co-located (QCL) relationship with the resource that transmitted the serving beams 112, 113, 121 and 131.

If the broad characteristics of the channel that carried the symbol on a first antenna port can be inferred from the channel that carried symbol on a second antenna port, the first antenna port and the second antenna port can be evaluated to be in a QCL relationship. For example, the broad characteristics may include at least one of a delay spread, a Doppler spread, a Doppler shift, an average gain, an average delay, and a spatial receiver parameter.

Figure 2:
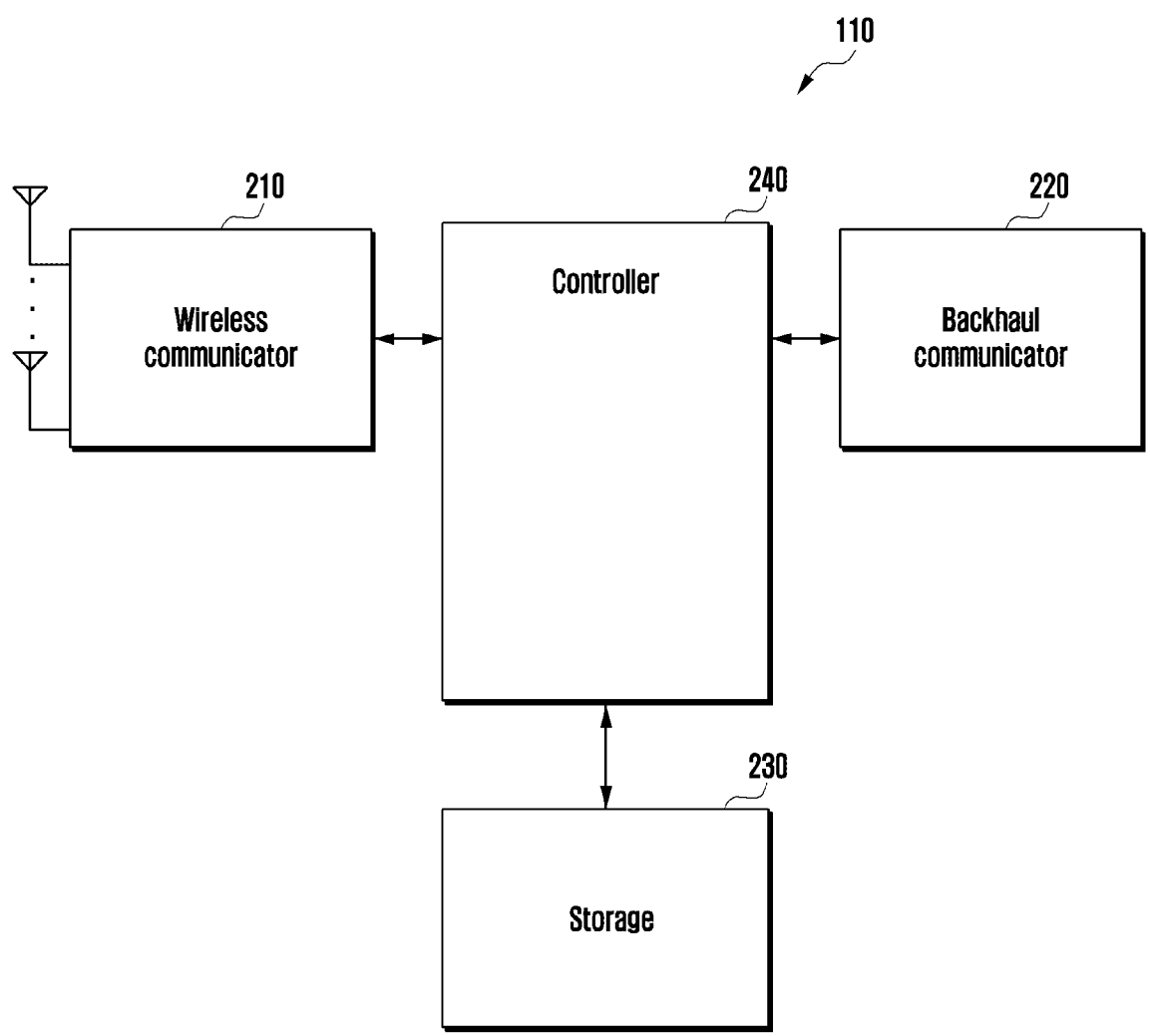
FIG. 2 illustrates a configuration of a base station in a wireless communication system according to various embodiments of the present disclosure.

FIG. 2 illustrates a configuration of a base station in a wireless communication system according to various embodiments of the present disclosure.

A configuration illustrated in FIG. 2 may be understood as the configuration of the base station 110. The terms " . . . part," " . . . unit," etc. used below mean a unit that processes at least one function or operation, which may be implemented by hardware or software, or a combination of hardware and software.

Referring to FIG. 2, the base station includes a wireless communicator 210, a backhaul communicator 220, a storage 230, and a controller 240.

The wireless communicator 210 performs functions for transmitting and receiving a signal via a wireless channel. For example, the wireless communicator 210 performs a conversion between a baseband signal and a bitstream according to a physical layer standard of a system. For example, when transmitting data, the wireless communicator 210 generates complex symbols by encoding and modulating a transmission bit stream. In addition, when receiving data, the wireless communicator 210 restores the received bitstream by demodulating and decoding the baseband signal.

The wireless communicator 210 up-converts the baseband signal into a radio frequency (RF) band signal to transmit the signal through an antenna, and down-converts the RF band signal received through the antenna into a baseband signal. To this end, the wireless communicator 210 may include a transmission filter, a reception filter, an amplifier, a mixer, an oscillator, a digital to analog converter (DAC), an analog to digital converter (ADC), and the like. The wireless communicator 210 may include a plurality of transmission and reception paths. Further, the wireless communicator 210 may include at least one antenna array composed of a plurality of antenna elements.

In terms of hardware, the wireless communicator 210 may be composed of a digital unit and an analog unit, and the analog unit may include a plurality of sub-units according to operating power, operating frequency, and the like. The digital unit may be implemented as at least one processor (e.g., a digital signal processor (DSP)).

The wireless communicator 210 transmits and receives a signal as described above. Accordingly, all or part of the wireless communicator 210 may be referred to as a "transmitter," a "receiver," or a "transceiver." In addition, in the following description, transmission and reception performed via a wireless channel are used to mean that the process as described above is performed by the wireless communicator 210.

The backhaul communicator 220 provides an interface for performing communication with other nodes in the network. That is, the backhaul communicator 220 converts a bit stream transmitted from a base station to other nodes, for example, another access node, another base station, an upper node, a core network, etc. into a physical signal, and converts the physical signal received from the other nodes into the bit stream.

The storage 230 stores data such as basic program, application program, configuration information for the operations of a base station. The storage 230 may be composed of a volatile memory, a nonvolatile memory, or a combination of a volatile memory and a nonvolatile memory. The storage 230 provides stored data according to a request of the controller 240.

The controller 240 controls overall operations of a base station. For example, the controller 240 transmits and receives a signal through the wireless communicator 210 or through the backhaul communicator 220. In addition, the controller 240 records data in the storage 230 and reads out data. The controller 240 may perform functions of a protocol stack required by a communication standard. According to another embodiment, the protocol stack may be included in the wireless communicator 210. To this end, the controller 240 may include at least one processor.

According to various embodiments, the controller 240 may transmit radio resource control configuration information to the terminals 120 and 130. The controller 240 may transmit sidelink configuration information to the terminals 120 and 130. For example, the controller 240 may control a base station to perform operations according to various embodiments described below.

Figure 3:
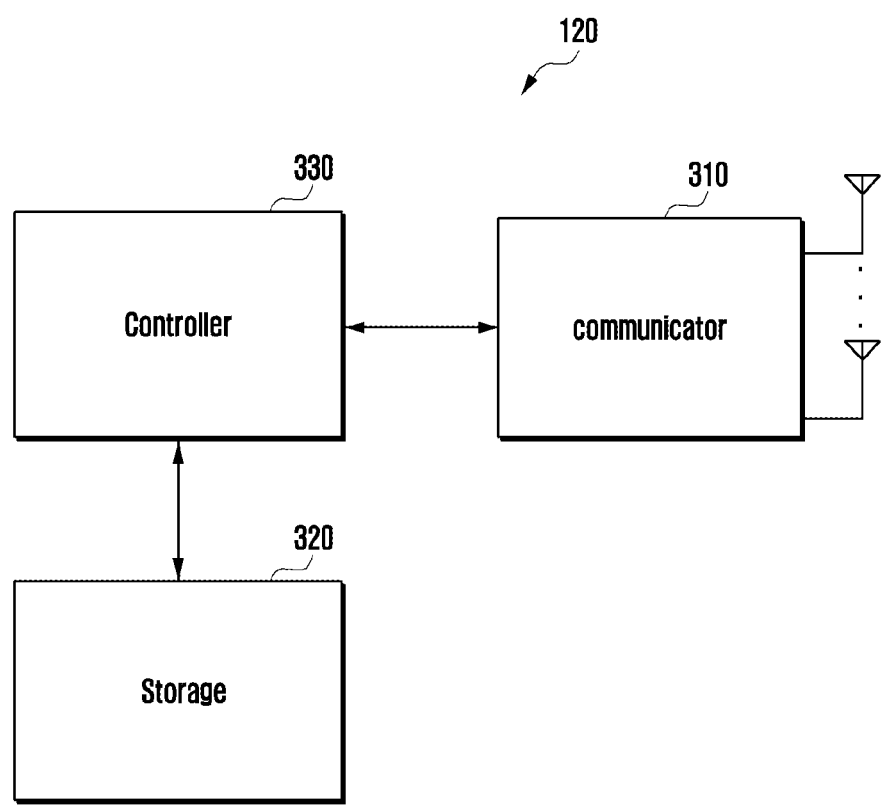
FIG. 3 illustrates a configuration of a terminal in a wireless communication system according to various embodiments of the present disclosure.

FIG. 3 illustrates a configuration of a terminal in a wireless communication system according to various embodiments of the present disclosure.

The configuration illustrated in FIG. 3 may be understood as the configuration of the terminal 1 120 or the terminal 2 130. The terms " . . . part," " . . . unit," etc. used below mean a unit that processes at least one function or operation, which may be implemented by hardware or software, or a combination of hardware and software.

Referring to FIG. 3, the terminal includes a communicator 310, a storage 320, and a controller 330.

The communicator 310 performs functions for transmitting and receiving a signal via a wireless channel. For example, the communicator 310 performs a conversion function between a baseband signal and a bit stream according to the physical layer standard of a system. For example, when transmitting data, the communicator 310 generates complex symbols by encoding and modulating a transmission bit stream. In addition, when receiving data, the communicator 310 restores the received bit stream by demodulating and decoding the baseband signal. The communicator 310 up-converts the baseband signal to an RF band signal to transmit the signal through an antenna and down-converts the RF band signal received through the antenna to the baseband signal. For example, the communicator 310 may include a transmission filter, a reception filter, an amplifier, a mixer, an oscillator, a DAC, an ADC, and the like.

The communicator 310 may include a plurality of transmission and reception paths. Furthermore, the communicator 310 may include at least one antenna array composed of a plurality of antenna elements. In terms of hardware, the communicator 310 may be composed of a digital circuit and an analog circuit (e.g., a radio frequency integrated circuit (RFIC)). Here, the digital circuit and the analog circuit may be implemented in one package. In addition, the communicator 310 may include a plurality of RF chains. In addition, the communicator 310 may perform beamforming.

The communicator 310 may include different communication modules to process signals of different frequency bands. Furthermore, the communicator 310 may include a plurality of communication modules to support a plurality of different radio access technologies. For example, the different radio access technologies may include Bluetooth low energy (BLE), wireless fidelity (Wi-Fi), Wi-Fi gigabyte (WiGig), cellular network (e.g., long term evolution (LTE)), and the like. In addition, the different frequency bands may include a super high frequency (SHF) (e.g., 2.5 GHz, 3.5 GHz, 5 GHz) band and a millimeter (mm) wave (e.g., 60 GHz) band.

The communicator 310 transmits and receives a signal as described above. Accordingly, all or part of the communicator 310 may be referred to as a "transmitter," a "receiver," or a "transceiver." In addition, in the following description, transmission and reception performed via a wireless channel are used to mean that the above-described process is performed by the communicator 310.

The storage 320 stores data such as basic program, application program, configuration information for the operations of a terminal. The storage 320 may be composed of a volatile memory, a nonvolatile memory, or a combination of a volatile memory and a nonvolatile memory. The storage 320 provides stored data according to a request of the controller 330.

The controller 330 controls overall operations of a terminal. For example, the controller 330 transmits and receives a signal through the communicator 310. In addition, the controller 330 records data in the storage 320 and reads out data. The controller 330 may perform functions of a protocol stack required by a communication standard. To this end, the controller 330 may include at least one processor or microprocessor or may be a part of a processor. In addition, a part of the communicator 310 and the controller 330 may be referred to as a communication processor (CP).

According to various embodiments, the controller 330 may perform a process of determining that the terminals 120 and 130 activate a function of assisting radio resource configuration for performing sidelink direct communication of another terminal, a process of informing another terminal and the base station 110 of the supporting capability for a function of assisting radio resource configuration, a process of acquiring information of another terminal to acquire sidelink radio resource information using the radio resource configuration supporting function of the terminals 120 and 130, a process of providing the acquired information to the base station 110, a process of receiving sidelink radio resource information of another terminal from the base station 110, and a process of transmitting the received sidelink radio resource information to the other terminal. For example, the controller 330 may control the terminal to perform operations according to various embodiments described below.

Figure 4A:
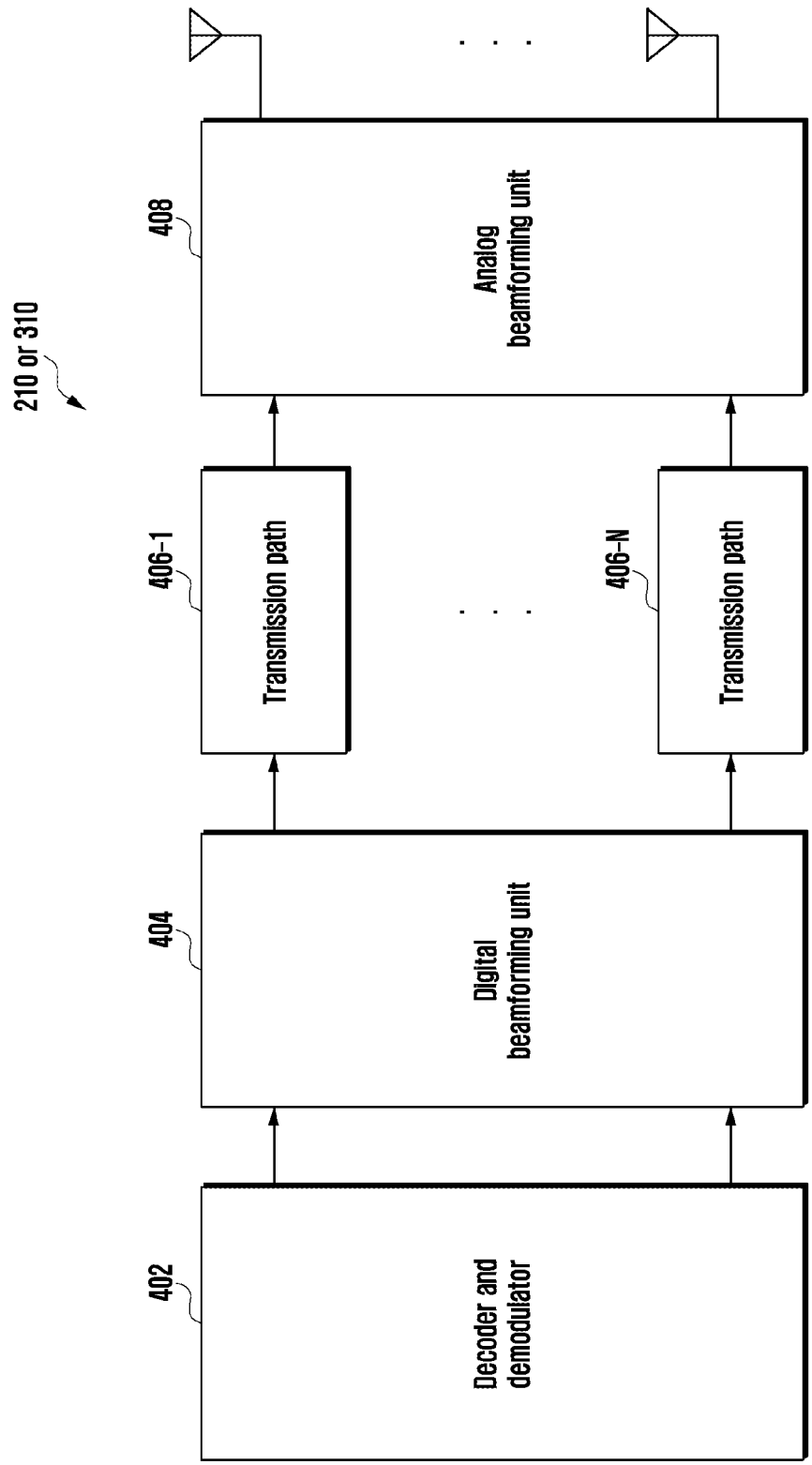
FIG. 4A illustrates a configuration of communicators in a wireless communication system according to various embodiments of the present disclosure.
Figure 4B:
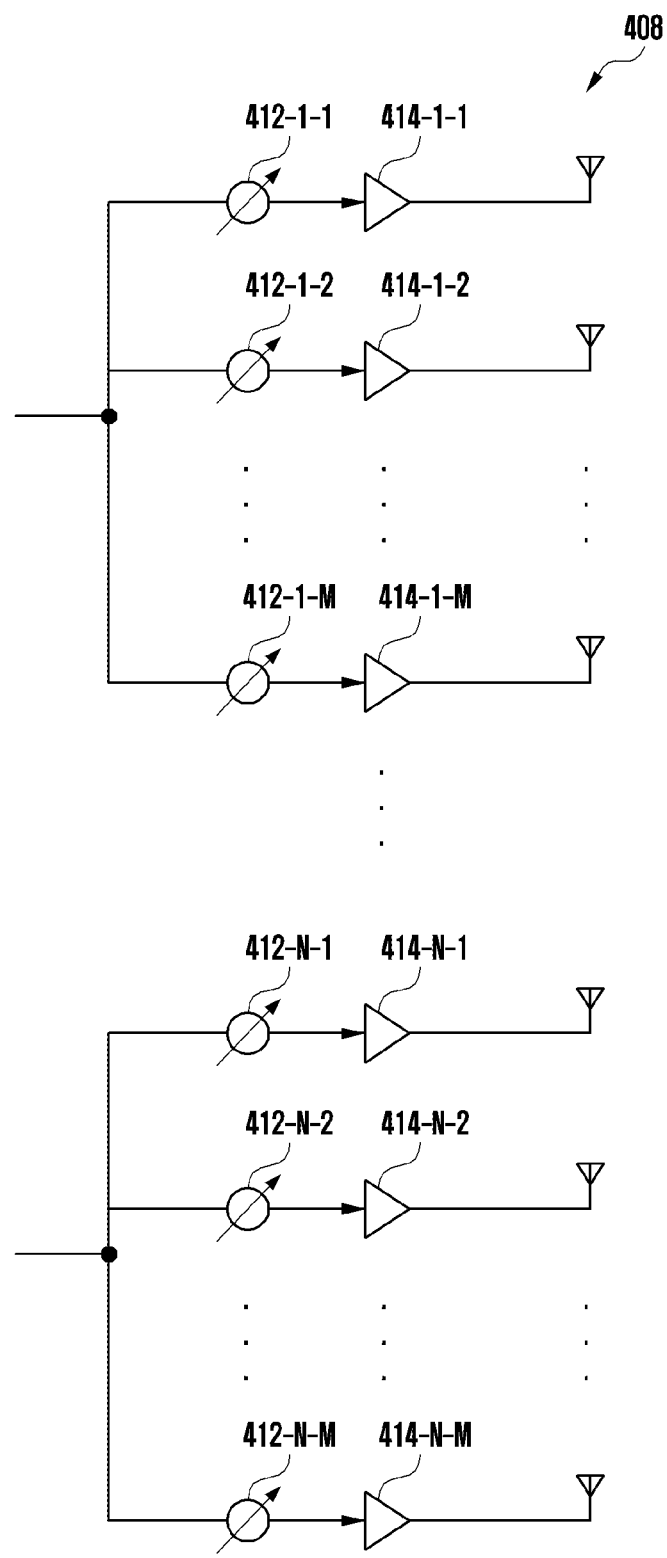
FIG. 4B illustrates a configuration of communicators in a wireless communication system according to various embodiments of the present disclosure.
Figure 4C:
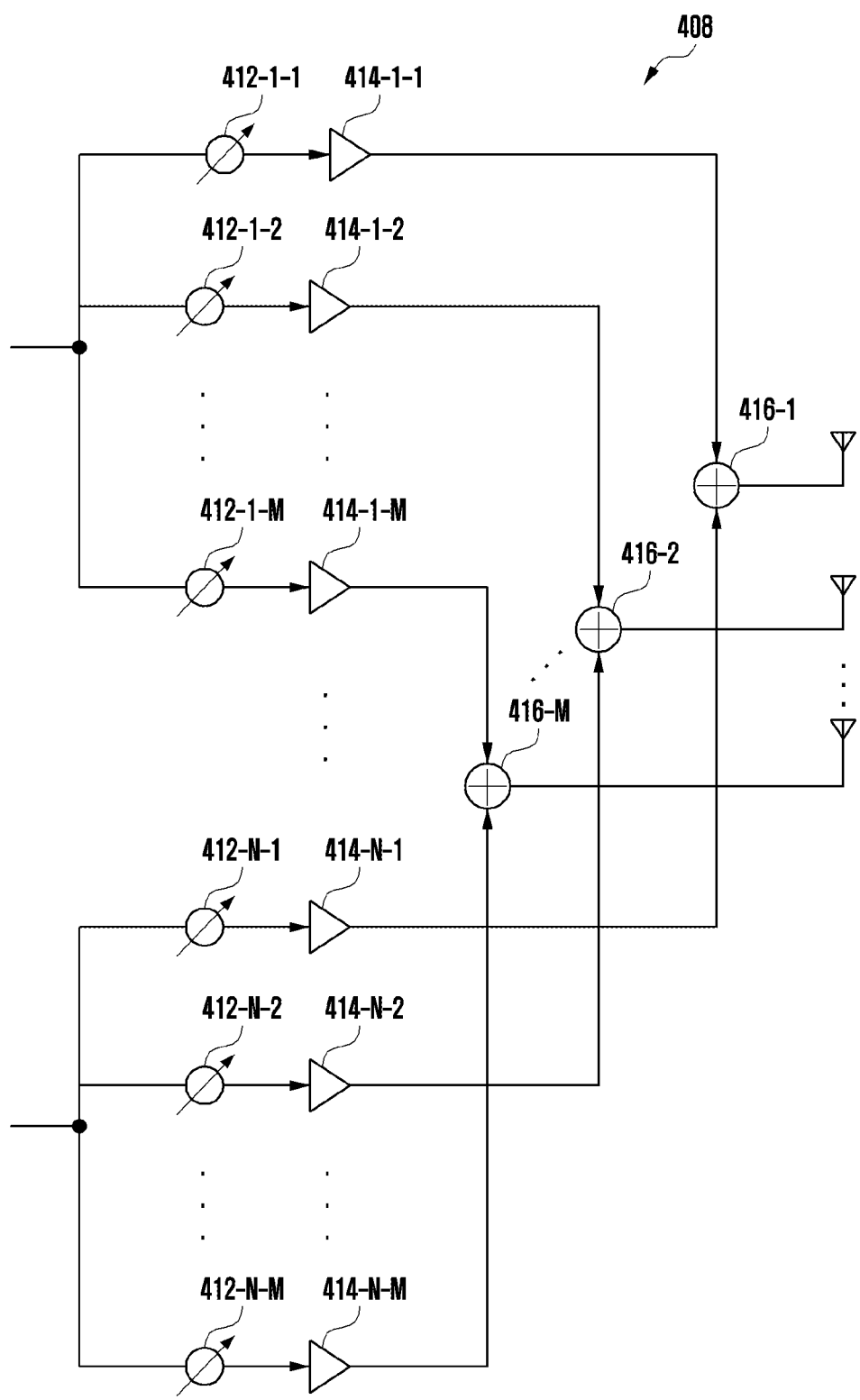
FIG. 4C illustrates a configuration of communicators in a wireless communication system according to various embodiments of the present disclosure.

FIG. 4A illustrates a configuration of communicators in a wireless communication system according to various embodiments of the present disclosure, FIG. 4B illustrates a configuration of communicators in a wireless communication system according to various embodiments, and FIG. 4C illustrates a configuration of communicators in a wireless communication system according to various embodiments.

FIGS. 4A to 4C illustrate examples of detailed configurations of the wireless communicator 210 of FIG. 2 or the communicator 310 of FIG. 3. Specifically, FIGS. 4A to 4C illustrate components for performing beamforming as a part of the wireless communicator 210 of FIG. 2 or the communicator 310 of FIG. 3.

Referring to FIG. 4A, the wireless communicator 210 or the communicator 310 includes an encoding and modulation unit 402, a digital beamforming unit 404, a plurality of transmission paths 406-1 to 406-N, and an analog beamforming unit 408.

The encoding and modulation unit 402 performs channel encoding. For channel encoding, at least one of a low density parity check (LDPC) code, a convolution code, and a polar code. The encoding and modulation unit 402 generates modulation symbols by performing constellation mapping.

The digital beamforming unit 404 performs beamforming on a digital signal (e.g., modulation symbols). To this end, the digital beamforming unit 404 multiplies the modulation symbols by beamforming weights. Here, the beamforming weights are used to change the magnitude and phase of the signal and may be referred to as a "precoding matrix," a "precoder," and the like. The digital beamforming unit 404 outputs the digital beamformed modulation symbols via a plurality of transmission paths 406-1 to 406-N. In this embodiment, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert digital beamformed digital signals into analog signals. To this end, each of the plurality of transmission paths 406-1 to 406-N may include an inverse fast Fourier transform (IFFT) calculator, a cyclic prefix (CP) inserter, a DAC, and an upconverter. The CP inserter is for an orthogonal frequency division multiplexing (OFDM) scheme and may be excluded when another physical layer scheme (e.g., a filter bank multi-carrier (FBMC)) is applied. That is, the plurality of transmission paths 406-1 to 406-N provide an independent signal processing process for the plurality of streams generated via digital beamforming. However, depending on the implementation manner, some of the components of the plurality of transmission paths 406-1 to 406-N may be used in common.

The analog beamforming unit 408 performs beamforming for an analog signal. To this end, the digital beamforming unit 404 multiplies the analog signals by beamforming weights. Here, the beamforming weights are used to change the magnitude and phase of the signal. In detail, the analog beamforming unit 408 may be configured as shown in FIG. 4B or 4C, according to a connection structure between the plurality of transmission paths 406-1 to 406-N and the antennas.

Referring to FIG. 4B, signals input to the analog beamforming unit 408 are transmitted through antennas through a phase/magnitude conversion and amplification operation. At this time, the signal of each path is transmitted through different antenna sets, that is, antenna arrays. Looking at the processing of the signal input via a first path, the signal is converted into signal sequences having different or the same phase/magnitude by the phase/magnitude converters 412-1-1 to 412-1-M, amplified by amplifiers 414-1-1 to 414-1-M, and then transmitted through the antennas.

Referring to FIG. 4C, the signals input to the analog beamforming unit 408 are transmitted through the antennas through phase/magnitude conversion and amplification operation. At this time, the signal of each path is transmitted through the same antenna set, that is, the antenna array. Looking at the processing of the signal input through the first path, the signal is converted into signal sequences having different or the same phase/magnitude by the phase/magnitude converters 412-1-1 to 412-1-M, and amplified by the amplifiers 414-1-1 to 414-1-M. The amplified signals are then summed by summation units 416-1-1 to 416-1-M, based on the antenna element to be transmitted through one antenna array and then transmitted through the antennas.

FIG. 4B illustrates an example in which an independent antenna array for each transmission path is used, and FIG. 4C illustrates an example in which transmission paths share one antenna array. However, according to another embodiment, some transmission paths may use an independent antenna array, and the other transmission paths may share one antenna array. Furthermore, according to another embodiment, by applying a switchable structure between transmission paths and antenna arrays, a structure that can be adaptively changed according to a situation may be used.

The V2X service may be divided into basic safety service and advanced service. The basic safety services may include detailed services such as vehicle notification (CAM or BSM) service, left turn notification service, front vehicle collision warning service, emergency vehicle access notification service, front obstacle warning service, intersection signal information service, and the like, and V2X information can be transmitted and received using a broadcast or unicast or a groupcast transmission method. The advanced service not only has enhanced QoS requirements than the basic safety services, but the advanced service also requires a method that can transmit and receive V2X information by using unicast and groupcast transmission methods in addition to broadcast transmission method to transmit and receive V2X information within a specific vehicle group or V2X information between two vehicles. The advanced services may be detailed services such as a cluster driving service, autonomous driving service, remote driving service, and extended sensor-based V2X service.

For the V2X service, a terminal (UE) in ng-RAN (gNB) connected to 5G core network or E-UTRAN (ng-eNB) connected to 5G core network may perform the V2X service via ng-RAN or E-UTRAN. As another embodiment, when a base station (ng-RAN or ng-eNB) is connected to an evolved packet core network (EPC), V2X service may be performed through the base station. As another embodiment, when the eNB is connected to an evolved packet core network (EPC), V2X service may be performed through the base station. At this time, the V2X wireless interface communication method that can be used for direct communication between terminals is at least one of unicast, groupcast, and broadcast, and may provide a way to manage and configure the wireless communication parameters suitable for QoS requirements of the V2X service when performing V2X transmission and reception in each communication method.

A system for performing direct communication between terminals, based on LTE wireless communication, defines a transmitting terminal to select and operate a parameter necessary for transmission by itself. In the LTE wireless communication base, V2X service message for basic safety is transmitted by a direct communication method between terminals. The QoS requirements of the basic safety V2X service are not strict, the QoS requirements between services are not varied even though the basic safety service is diverse, and differentiation between services is not great. Therefore, even in a mode in which a base station schedules radio resources to be used for direct communication between terminals, based on LTE wireless communication, the base station does not need to acquire QoS requirement information for V2X services in detail, and schedules radio resource, and operates at a level in which the terminal arbitrarily manages and configures parameters.

The advanced V2X services have various QoS requirements and vary greatly in the level of QoS required for each V2X service. In the embodiment of certain advanced V2X services, the radio resources and radio parameters for direct communication may be configured to satisfy the stringent QoS requirements of the service before the service can operate. Therefore, a system based on direct communication between terminals for supporting the advanced V2X service may provide a method of guaranteeing QoS of the service compared with the conventional system.

According to various embodiments of the disclosure, a method of obtaining sidelink radio resource information for performing direct communication between vehicles required by basic safety service or advanced service will be described.

Figure 5A:
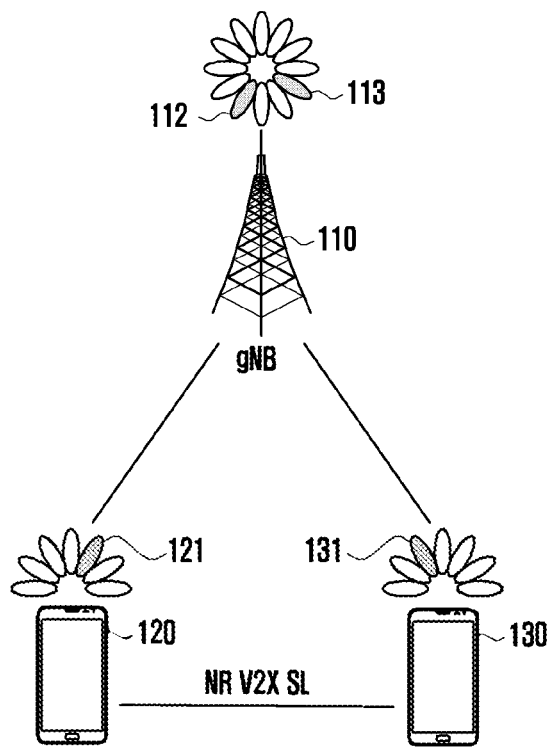
FIG. 5A illustrates a situation in which direct communication between terminals is performed by using a sidelink radio access technology (RAT) according to various embodiments of the present disclosure.
Figure 5B:
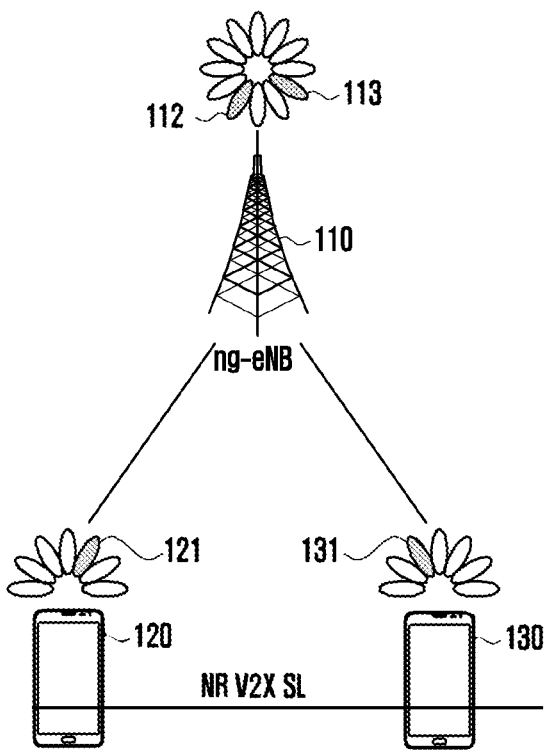
FIG. 5B illustrates a situation in which direct communication between terminals is performed by using a sidelink radio access technology (RAT) according to various embodiments of the present disclosure.
Figure 5C:
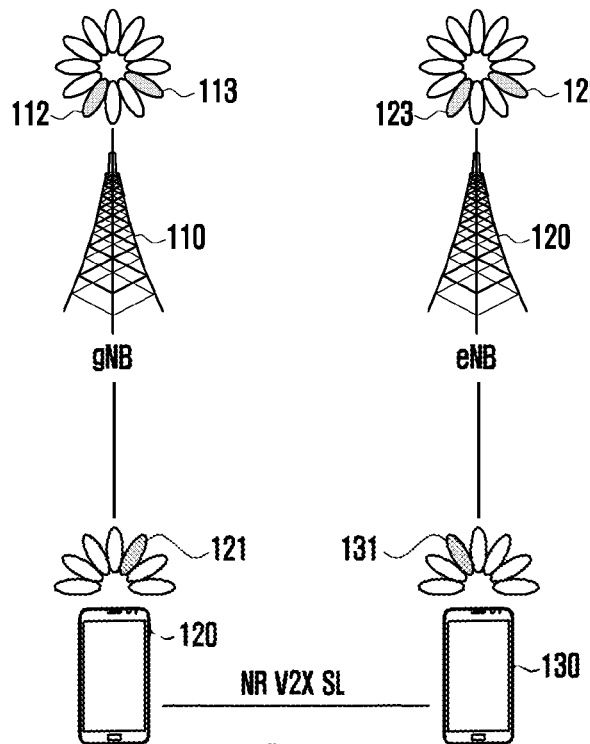
FIG. 5C illustrates a situation in which direct communication between terminals is performed by using a sidelink radio access technology (RAT) according to various embodiments of the present disclosure.
Figure 5D:
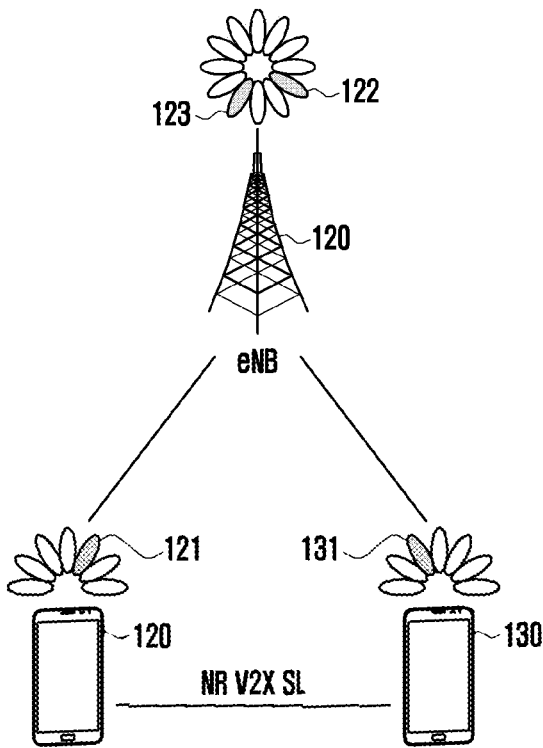
FIG. 5D illustrates a situation in which direct communication between terminals is performed by using a sidelink radio access technology (RAT) according to various embodiments of the present disclosure.

FIG. 5A illustrates a situation in which direct communication between terminals is performed by using a sidelink radio access technology (RAT) according to various embodiments of the present disclosure. FIG. 5B illustrates a situation in which direct communication between terminals is performed by using a sidelink radio access technology (RAT) according to various embodiments, FIG. 5C illustrates a situation in which direct communication between terminals is performed by using a sidelink radio access technology (RAT) according to various embodiments of the present disclosure. FIG. 5D illustrates a situation in which direct communication between terminals is performed by using a sidelink radio access technology (RAT) according to various embodiments of the present disclosure.

FIG. 5A illustrates a scenario in which terminals in gNB coverage perform direct communication. In FIG. 5A, resource allocation configuration parameter information of a sidelink radio bearer to be used for transmitting and receiving unicast, broadcast, or groupcast based V2X packets between terminals may be transmitted to terminals 120 and 130 via a system information message or an RRC dedicated message of a gNB 110, or may be preconfigured in the terminals 120 and 130. The terminals 120 and 130 performing direct communication may transmit sidelink resource allocation request information necessary for V2X service packet transmission to the gNB 110 and obtain sidelink resource allocation and/or configuration information from the gNB 110. The sidelink resource allocation request information to sidelink resource allocation and/or configuration information may be transmitted via a terminal assisting radio resource configuration.

FIG. 5B illustrates a scenario in which terminals 120 and 130 in ng-eNB coverage perform direct communication. In FIG. 5B, configuration parameter information of a sidelink radio bearer to be used for transmitting and receiving unicast, groupcast, or broadcast-based V2X packets between terminals may be transmitted to terminals 120 and 130 via a system information message or an RRC dedicated message of a ng-eNB 110, or may be preconfigured in the terminals 120 and 130. The terminals 120 and 130 performing direct communication may transmit sidelink resource allocation request information necessary for V2X service packet transmission to the ng-eNB 110 and obtain sidelink resource allocation and/or configuration information from the ng-eNB 110. The sidelink resource allocation request information to sidelink resource allocation and/or configuration information may be transmitted via a terminal assisting radio resource configuration.

FIG. 5C illustrates a scenario in which the terminal 120 in gNB coverage and the terminal 130 in eNB coverage perform direct communication. In FIG. 5C, configuration parameter information of a sidelink radio bearer to be used for transmitting and receiving unicast, groupcast, or broadcast-based V2X packets between terminals may be transmitted to terminals 120 and 130 via a system information message or an RRC dedicated message of a gNB 110, or may be preconfigured in the terminals 120 and 130. The terminals 120 and 130 performing direct communication may transmit sidelink resource allocation request information necessary for V2X service packet transmission to the gNB 110 and obtain sidelink resource allocation and/or configuration information from the gNB 110. The sidelink resource allocation request information to sidelink resource allocation and/or configuration information may be transmitted via a terminal assisting radio resource configuration.

FIG. 5D illustrates a scenario in which terminals 120 and 130 in eNB coverage perform direct communication. The configuration parameter information of a sidelink radio bearer to be used for transmitting and receiving unicast, groupcast, or broadcast-based V2X packets between terminals may be transmitted to terminals 120 and 130 via a system information message or an RRC dedicated message of a eNB 110, or may be preconfigured in the terminals 120 and 130. The terminals 120 and 130 performing direct communication may transmit sidelink resource allocation request information necessary for V2X service packet transmission to the eNB 110 and obtain sidelink resource allocation and/or configuration information from the eNB 110. The sidelink resource allocation request information to sidelink resource allocation and/or configuration information may be transmitted via a terminal assisting radio resource configuration.

According to various embodiments of the disclosure, the sidelink radio resources transmitted by a terminal assisting in configuring a sidelink radio resource for direct communication between terminals can be used for transmitting/receiving V2X messages of a unicast method, transmitting/receiving V2X messages of a broadcasted method, or transmitting/receiving V2X messages of a groupcast method.

Next, a scenario in which sidelink mode 2 (d) is operated among sidelink resource allocation methods required for direct communication between terminals will be described with reference to FIGS. 6A to 6C.

Figure 6A:
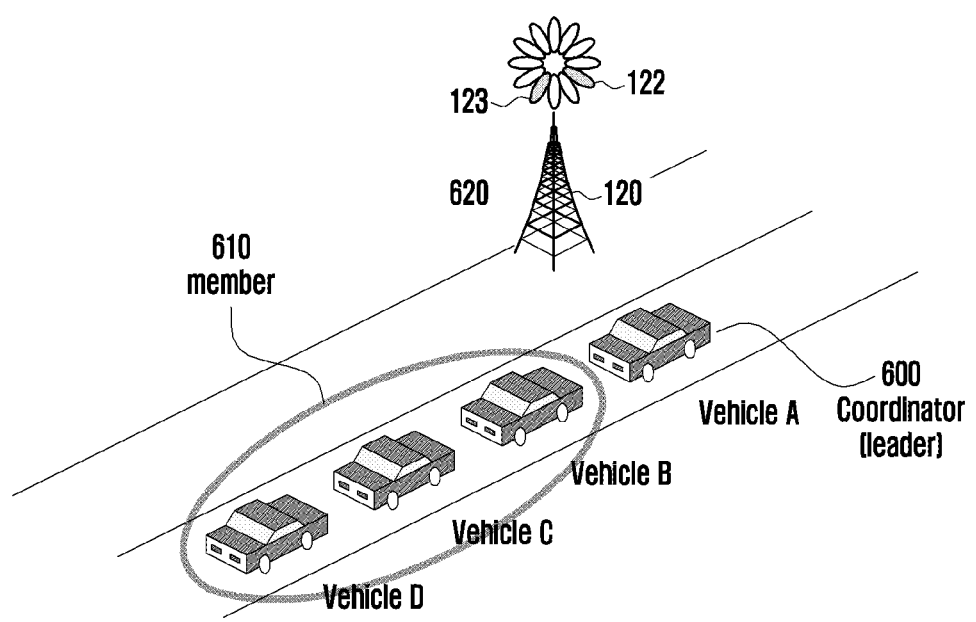
FIG. 6A illustrates a scenario of operating mode 2 (d) of a sidelink resource allocation scheme according to various embodiments of the present disclosure.

FIG. 6A illustrates a scenario of operating mode 2 (d) of a sidelink resource allocation scheme according to various embodiments of the present disclosure. FIG. 6B illustrates a scenario of operating mode 2 (d) of a sidelink resource allocation scheme according to various embodiments of the present disclosure. FIG. 6C illustrates a scenario of operating mode 2 (d) of a sidelink resource allocation scheme according to various embodiments of the present disclosure.

Various embodiments of the disclosure are described in the environment where a terminal is located in a base station coverage and the terminal is in an RRC connected mode, for example, but may also be applied when the terminal is in an RRC idle mode or an RRC connection deactivation mode or out-of-coverage.

The sidelink mode-2 (d) corresponds to a resource allocation method that can obtain the sidelink resource information of a terminal A supporting direct communication between terminals through a terminal B supporting direct communication between terminals. The resource information may correspond to a resource pool or resource allocation configuration information required for the terminal A to request a sidelink resource from the base station, and the resource information is allocated from the base station. The resource information may correspond to a resource pool or resource allocation configuration information necessary for the terminal A to directly select a sidelink resource. The resource information may correspond to sidelink resources allocated by the base station.

When receiving the resource pool or resource allocation configuration information, the terminal A may perform a procedure for receiving a sidelink resource to be actually used by the base station, and the terminal A may perform direct communication with another terminal, based on the allocated resource. When receiving the resource pool or resource allocation configuration information, the terminal A may select a resource by itself (e.g., sensing based or random selection) and perform direct communication with another terminal on the selected resource. Information indicating whether the terminal A uses the mode of allocating sidelink resources from the base station or uses the mode of allocating sidelink resources by itself may be included in the resource pool or resource allocation configuration information received through the terminal B. The terminal B may correspond to an assistant terminal that performs an operation for obtaining resource information from the base station for the terminal A. The terminal A may be referred to as a target terminal.

FIG. 6A illustrates an embodiment of platooning. The platooning may be an embodiment of static group communication of the present disclosure. The platooning according to various embodiments of the disclosure may be performed by vehicle terminals by forming a group to perform direct communication between the terminals. The group may include a reader terminal 600 and a member terminal 610. When the group leader terminal 600 and the member terminal 610 are within the coverage of the base station 620, the group leader terminal 600 and the member terminal 610 may obtain sidelink radio configuration information for performing direct communication between terminals in the group from the base station 620.

According to an embodiment of the disclosure, the group leader terminal 600 may serve as an assistant terminal for acquiring sidelink resource information from the base station 620 for the member terminal 610. The member terminal 610 may transmit and receive data using the sidelink radio resources allocated by the base station 620, based on the sidelink resource information received through the group leader terminal 600, transmit and receive data through the allocated resource by performing a procedure of allocating a sidelink radio resource with the base station 620, or transmit and receive data through an allocated resource by selecting a sidelink radio resource by itself. The base station 620 may perform a configuration information exchange procedure with the group leader terminal 600 to configure sidelink radio resource information to be used by the member terminal 610.

Figure 6B:
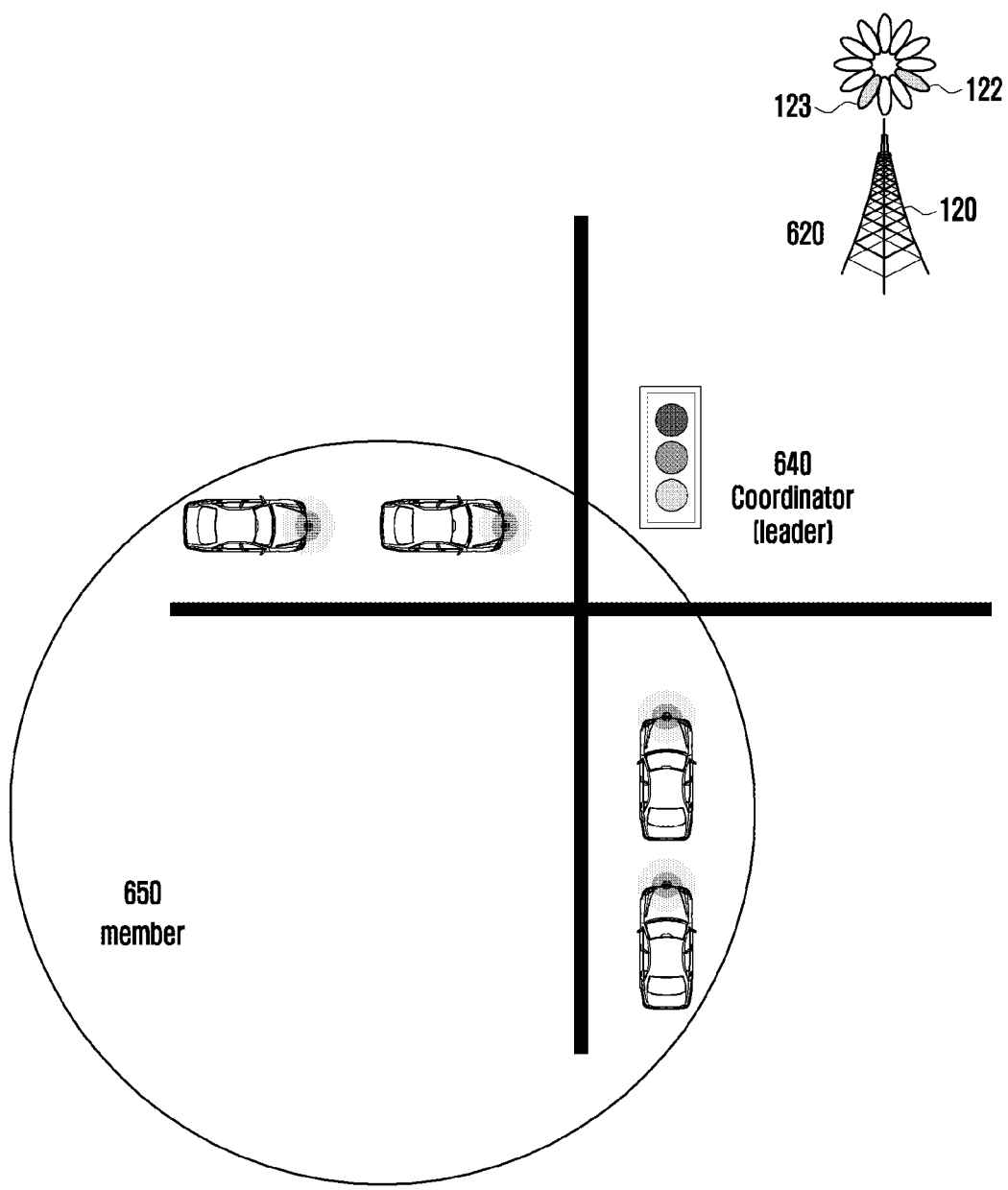
FIG. 6B illustrates a scenario of operating mode 2 (d) of a sidelink resource allocation scheme according to various embodiments of the present disclosure.

Referring to FIG. 6B, an embodiment in which a vehicle, an infrastructure, a pedestrian terminal, or the like performs group communication in an intersection area is illustrated. The intersection group communication may be an embodiment of dynamic group communication. According to various embodiments of the disclosure, a vehicle terminal, a pedestrian terminal, and an infrastructure terminal may form a group to perform direct communication between the terminals. The group may include a reader terminal 640 and a member terminal 650. In an embodiment of the disclosure, the infrastructure terminal installed at an intersection may be the group leader terminal 640, and the vehicle terminal and a pedestrian terminal located at an intersection may be the member terminals 650. When the group leader terminal 640 and the member terminal 650 are within the coverage of the base station 620, the group leader terminal 640 and the member terminal 650 may obtain sidelink radio configuration information for performing direct communication between terminals in the group from the base station 620.

According to an embodiment of the disclosure, the group leader terminal 640 may serve as an assistant terminal for acquiring sidelink resource information from the base station 620 for the member terminals 650. The member terminals 650 may transmit and receive data using the sidelink radio resources allocated by base station 620, based on the sidelink resource information received through the group leader terminal 640, transmit and receive data through the allocated resource by performing a procedure of allocating a sidelink radio resource with the base station 620, or transmit and receive data through an allocated resource by selecting a sidelink radio resource by itself. The base station 620 may perform a configuration information exchange procedure with the group leader terminal 640 to configure sidelink radio resource information to be used by the member terminals 650.

Figure 6C:
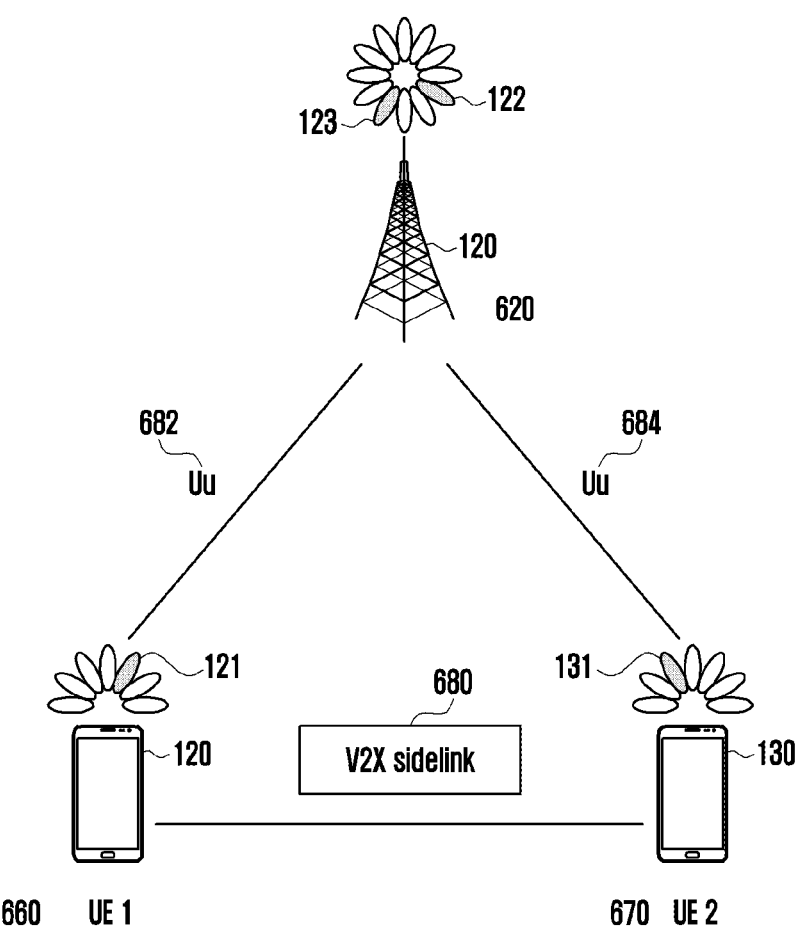
FIG. 6C illustrates a scenario of operating mode 2 (d) of a sidelink resource allocation scheme according to various embodiments.

Referring to FIG. 6C, a configuration for acquiring sidelink radio resource information between a base station 620, a UE1 660, and a UE2 670 according to various embodiments of the disclosure is illustrated. The base station 620, the UE1 660, and the UE2 670 may exchange control signals and data through the Uu interfaces 682 and 684, respectively. The UE1 660 and UE2 670 may exchange control signals and data via sidelink interface 680. According to an embodiment of the disclosure, the UE1 660 may perform a function of assisting sidelink radio resource configuration of the UE2 670. The UE1 660 may request the base station 620 for sidelink radio resource configuration information of the UE2 670 and obtain sidelink radio resource configuration information for the UE2 670 from the base station 620 to transmit the same to the UE2 670.

According to various embodiments of the disclosure, a terminal supporting the sidelink radio resource configuration assistant terminal function (hereinafter, referred to as an assistant terminal) may be previously designated by a V2X server or a V2X administrator. For example, the platooning leader terminal 600 of FIG. 6A or the infrastructure terminal 640 installed at the intersection of FIG. 6B may be configured to have a function of an assistant terminal.

According to an embodiment of the disclosure, the terminal may determine whether the mode-2 (d) sidelink wireless communication is configured. For example, in at least one of the cases wherein if the terminal is located in a mode-2 (d) enabling zone, if an application related to the mode-2 (d) sidelink wireless communication is executed, if a resource information for the mode-2 (d) sidelink wireless communication is received from a base station, the terminal may determine that the mode-2 (d) sidelink wireless communication is established.

An embodiment of the condition in which the assistant terminal function is activated may be always activated while the V2X function is activated. For example, it is determined that the mode-2 (s) sidelink wireless communication is configured for the terminal by satisfying the conditions as described above. Accordingly, when the V2X function is activated, the assistant terminal function of the terminal may be activated.

Other embodiments of the condition in which the assistant terminal function is activated may include at least one of: (1) when located in the mode-2 (d) enabling zone; (2) when the mode-2 (d) interested V2X application is executed; and (3) when both conditions (1) and (2) are satisfied. The mode-2 (d) enabling zone information may be indicated by at least one of information previously configured in the V2X server, the base station, and the terminal.

According to an embodiment, enabling zone configuration information may be transferred to the terminal via NW configured (RRC dedicated or system information) and pre-configuration.

As another embodiment, the enabling zone may be configured to be activated for an SL bearer, an SL flow, or an SL application.

In the case of a specific SL bearer, the enabling zone may be operated. In addition, the enabling zone configuration information may be included in the SL bearer configuration information.

In the operation of the terminal processing the SL bearer configuration and enabling zone configuration, when the configuration is obtained, the terminal activates the assistant terminal function for the corresponding SL bearer, for example, when the configuration is obtained, the terminal may activate the mode-2 (d) function for the corresponding SL bearer.

Meanwhile, the enabling zone may be operated for a specific SL flow. For example, enabling zone configuration information may be included in the SL flow configuration information. In the operation of the terminal processing the SL configuration and enabling zone configuration, when the configuration is obtained, the terminal activates the assistant terminal function for the corresponding SL flow, for example, when the configuration is obtained, the terminal may activate the mode-2 (d) function for the corresponding SL flow.

Alternatively, the enabling zone may be operated for specific applications.

Application and enabling zone configuration mapping information may be transferred to an AS layer in a terminal upper layer (V2X layer or upper layer). The assistant terminal function activation for an application is as shown in the example of Table 1, and the assistant terminal function activation configuration information based on Table 1 may be transferred to the AS layer. In the operation of the terminal processing the SL configuration and enabling zone configuration, when the configuration is obtained, the terminal activates the assistant terminal function for the corresponding SL application, for example, when the configuration is obtained, the terminal activates the mode-2 (d) function for the corresponding SL application. An example of information indicating the SL application in the AS layer may include at least one of a destination identifier or a source identifier corresponding to the SL application.

The mode-2 (d) enabling zone may be, for example, the platooning of FIG. 6A or the intersection of FIG. 6B. The mode-2 (d) enabling zone may be operated while the platooning is running (e.g., from departure to arrival). The mode-2 (d) enabling zones may be operated for intersections in specific areas. When the assistant terminal is located in the mode-2 (d) enabling zone, the assistant terminal may activate the assistant terminal function.

A mode-2 (d) interested V2X application may be indicated by the V2X server or preconfigured in the terminal. Table 1 shows the application list corresponding to Mode-2(d) interest.

TABLE 1

Application list and Mode-2(d) interest

| Application list | Mode-2(d) interest |
|---|---|
| App_A | No |
| App_B | Yes |
| App_c | Yes |

The determination for mode-2 (d) interested V2X application may be performed in the upper layer of the assistant terminal. According to the example of Table 1, the terminal may determine that it is not necessary to support mode-2 (d) for the packet of App_A and may not activate the assistant terminal function. The terminal may determine that the packet of App_B to App_C can support the mode-2 (d) and activate the assistant terminal function.

According to various embodiments of the disclosure, a terminal that supports a function of receiving sidelink radio resource configuration (hereinafter, referred to as a target terminal) may be previously designated by a V2X server or a V2X administrator. For example, the platooning member terminal 610 of FIG. 6A or the vehicle terminal or the pedestrian terminal 650 located at the intersection of FIG. 6B may be configured to have a function of a target terminal. According to an embodiment of the disclosure, the target terminal function may be activated together while the V2X function is activated. Other embodiments of the condition in which the target terminal function is activated may include at least one of: (1) when located in the mode-2 (d) enabling zone; (2) when the mode-2 (d) interested V2X application is executed; and (3) when both conditions (1) and (2) are satisfied. The mode-2 (d) enabling zone may be, for example, the platooning of FIG. 6A or the intersection of FIG. 6B. The target terminal may activate the target terminal function when located in the mode-2 (d) enabling zone. The mode-2 (d) interested V2X application for activating the target terminal function may be indicated by the V2X server or configured in advance in the terminal, as shown in Table 1. The upper layer of the target terminal may determine the mode-2 (d) interested V2X application with reference to Table 1.

The method for determining whether the assistant terminal or the target terminal is located in the mode-2 (d) enabling zone may include at least one or a combination of: (1) determining by comparing the location coordinates of the terminal based on the GNSS or GPS mode-2 (d) enabling zone information indicated by the base station or set in the terminal; (2) mode-2 (d) enabling zone indicator transmitted by the base station; and (3) mode-2 (d) enabling zone indicator transmitted by the assistant terminal.

The zone configuration information that may be used by the assistant terminal or the target terminal to determine the mode-2 (d) enabling zone may include the following as shown in Table 2 below. For example, the terminal may receive the zone configuration information from the base station as shown in Table 2 below.

TABLE 2

Zone configuration information

```
SL-ZoneConfig-r16 ::= SEQUENCE {
    sl-ZoneLength-r16      ENUMERATED { m5, m10, m20, m50, m100, m200, m500, spare1},
    sl-ZoneWidth-r16       ENUMERATED { m5, m10, m20, m50, m100, m200, m500, spare1},
    sl-ZoneIdLongiMod-r16      INTEGER (1..4),
    sl-ZoneIdLatiMod-r16       INTEGER (1..4),
    ...
}
```

The assistant terminal or the target terminal may calculate a zone ID as follows, based on the zone configuration information as shown in Table 3 below.

TABLE 3

Zone ID $x_1$ = Floor (x/L) Mod Nx;
$y_1$ = Floor (y/W) Mod Ny;
Zone_id = $y_1$ * Nx + $x_1$.

The parameters in the formulae are defined as follows:
L is the value of sl-ZoneLength included insl-ZoneConfig;
W is the value of sl-ZoneWidth included insl-ZoneConfig;
Nxis the value of sl-ZoneIdLongiMod included insl-ZoneConfig;
Nyis the value of sl-ZoneIdLatiMod included insl-ZoneConfig;
x is the geodesic distance in longitude between UE's current location and geographical coordinates (0, 0) according to WGS84 model [yx] and it is expressed in meters;
yis the geodesic distance in latitude between UE's current location and geographical coordinates (0, 0) according to WGS84 model [yx] and it is expressed in meters.

As an example, the target terminal may determine whether the zone ID of the terminal is included in the mode-2 (d) zone ID list transmitted by the base station to determine whether there is the mode-2 (d) enabling zone.

As an example, the target terminal may determine whether the zone ID is the mode-2 (d) enabling zone by determining whether the zone ID of the target terminal is included in the mode-2 (d) zone ID list transmitted by the base station or the assistant terminal.

As another embodiment, the assistant terminal may determine whether the zone ID is the mode-2 (d) enabling zone by determining whether the mode-2 (d) enabling zone indicator is included in the signaling transmitted by the base station.

As another embodiment, the target terminal may determine whether the zone ID is the mode-2 (d) enabling zone by determining whether the mode-2 (d) enabling zone indicator is included in the signaling transmitted by the base station or the assistant terminal.

As another embodiment, the assistant terminal may determine whether the zone ID is the mode-2 (d) enabling zone by determining whether the mode-2 (d) enabling zone indicator is configured to enabled or disabled in the signaling transmitted by the base station.

As another embodiment, the target terminal may determine whether the zone ID is the mode-2 (d) enabling zone by determining whether the mode-2 (d) enabling zone indicator is configured to enabled or disabled in the signaling transmitted by the base station or the assistant terminal.

According to various embodiments, the assistant terminal 660 may transmit capability information on the mode-2 (d) function to the base station 620 through the Uu interface 682 when the mode-2 (d) function is activated.

When the base station 620 does not transmit the mode-2 (d) enabling zone indicator, the base station 620 may transmit mode-2 (d) enabling zone indicator when the base station 620 determines that there is an assistant terminal 660 having the capability for the mode-2 (d) function. When the mode-2 (d) function is activated, the assistant terminal 660 may transmit the mode-2 (d) function indication information and/or the mode-2 (d) enabling zone indicator via a sidelink interface 680 to a target terminal 670. An embodiment of the mode-2 (d) function indication information and/or the mode-2 (d) enabling zone indicator transmission and reception procedure through the sidelink interface 680 will be described with reference to FIGS. 8A to 8C. When the mode-2 (d) function is activated, the assistant terminal 660 may determine whether to establish a PC5 RRC unicast connection with the target terminal 670, and if the target terminal 670 and the PC5 RRC unicast connection is not established, the assistant terminal 660 may perform the PC5 RRC unicast connection configuration procedure.

According to various embodiments of the disclosure, when the mode-2 (d) function is activated, the target terminal 670 may transmit capability information on the mode-2 (d) function to the base station 620 through the Uu interface 684. The upper layer (e.g., V2X layer, application layer) of the target terminal 670 may indicate the AS layer to activate the mode-2 (d) function. The target terminal 670 may determine whether to establish the PC5 RRC unicast connection with the assistant terminal 660 when the mode-2 (d) function is activated, and the target terminal 670 may perform a PC5 RRC unicast connection configuration procedure when the assistant terminal 660 and the PC5 RRC unicast connection is not established.

Figure 7A:
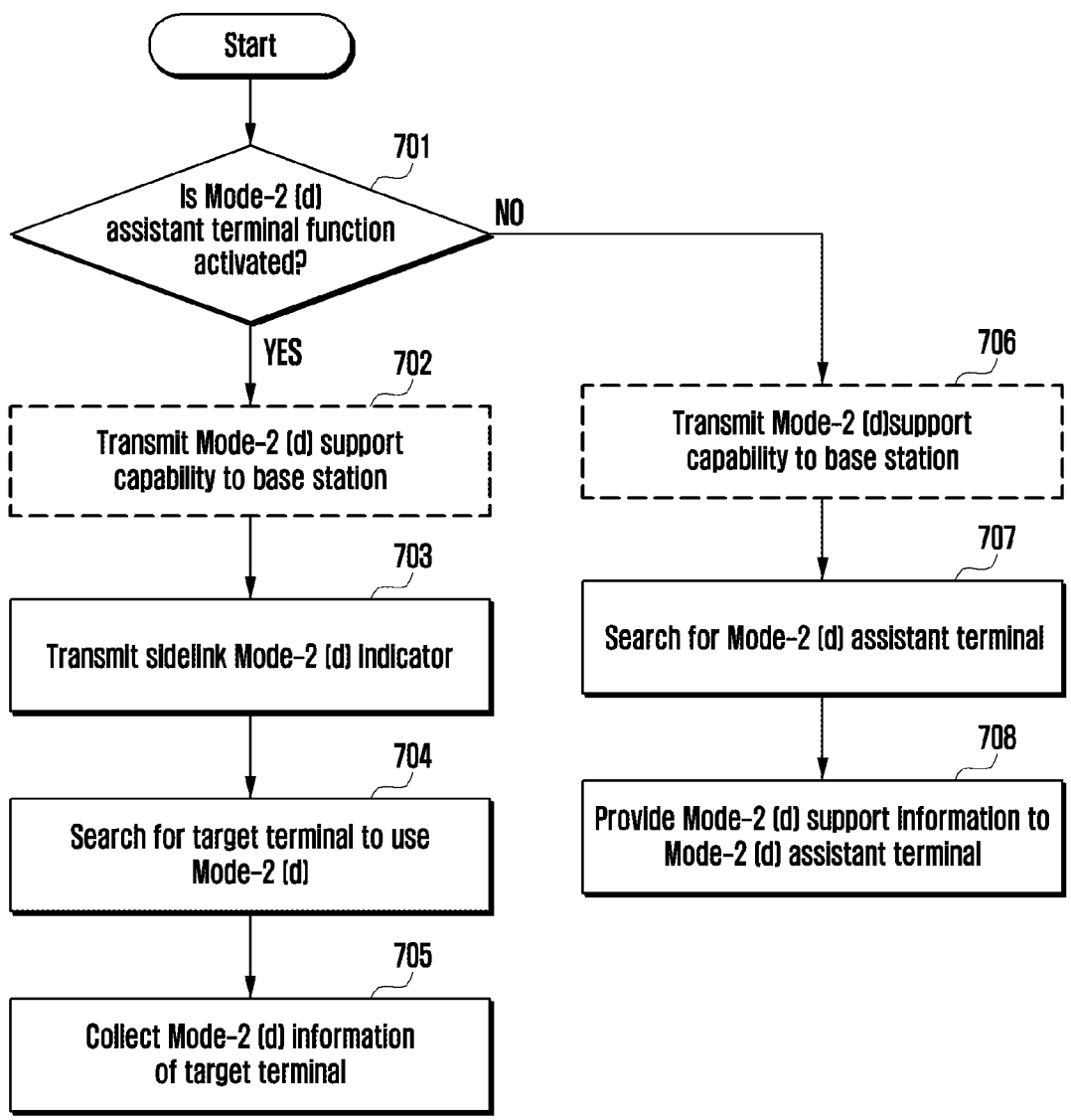
FIG. 7A illustrates an operation of a terminal triggering sidelink mode-2 (d) according to various embodiments of the present disclosure.
Figure 7B:
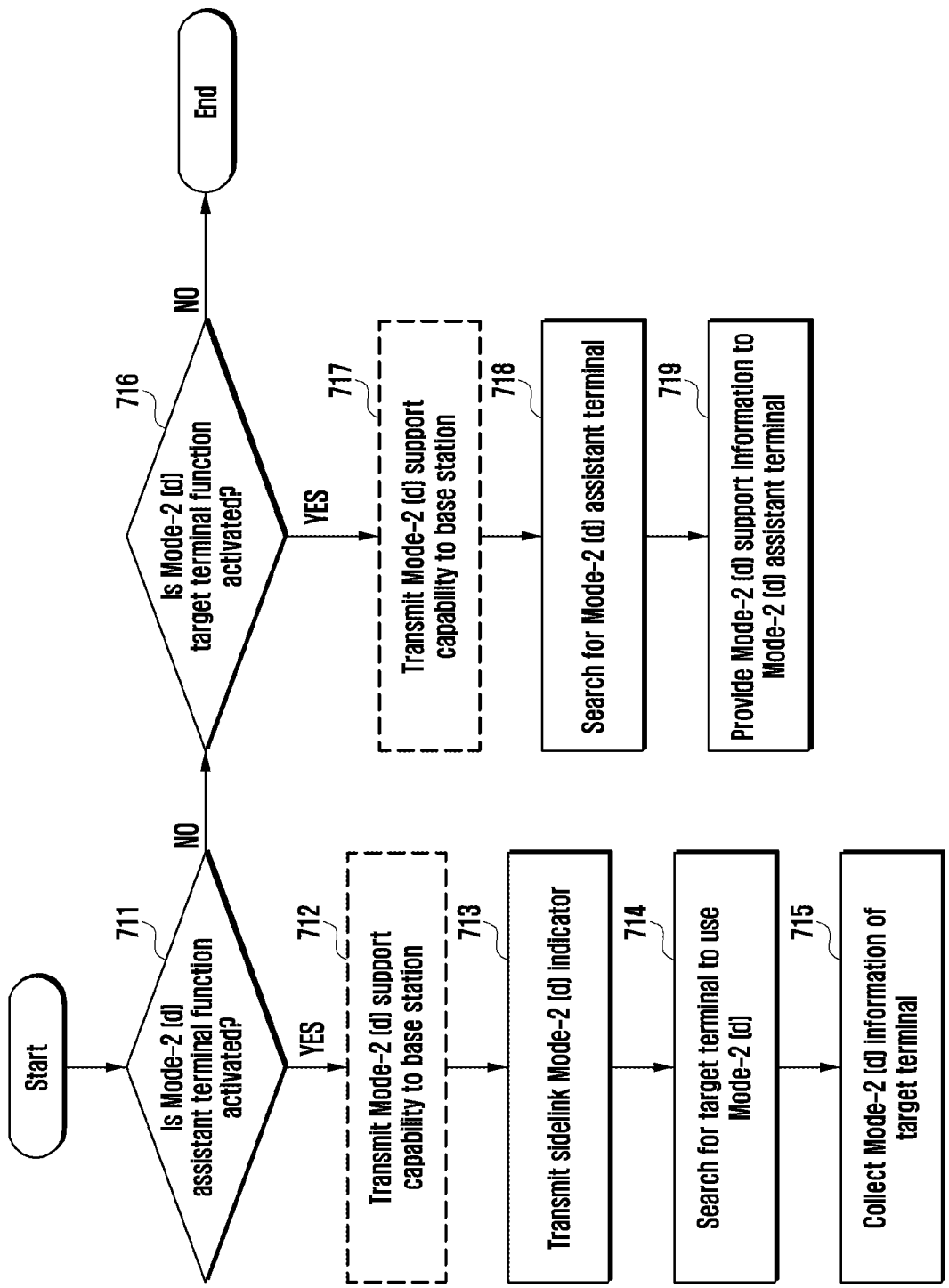
FIG. 7B illustrates an operation of a terminal triggering sidelink mode-2 (d) according to various embodiments of the present disclosure.

FIG. 7A illustrates an operation of a terminal triggering sidelink mode-2 (d) according to various embodiments of the present disclosure. FIG. 7B illustrates an operation of a terminal triggering sidelink mode-2 (d) according to various embodiments of the present disclosure.

Referring to FIG. 7A, in operation 701, the terminal may determine whether the assistant terminal function is activated. Assistant terminal function activation may be performed when at least one or a combination of the following Table 4 is satisfied.

TABLE 4

Assistant terminal function (1) Support assistant terminal function
(2) Located in mode-2 (d) enabling zone
(3) Execute mode-2 (d) interest V2X application Meanwhile, according to an embodiment of the disclosure, before determining whether to activate the assistant terminal function, the terminal may determine whether to configure the mode-2 (d) sidelink wireless communication, based on at least one predetermined condition.

If the assistant terminal function is activated by the determination in operation 701, the terminal may inform the base station of mode-2 (d) support capability and/or mode-2 (d) assistant terminal function capability in operation 702. The operation 702 may be omitted when the base station does not need to know the mode-2 (d) assistant terminal function capability and/or when the terminal is not in an RRC connection activation state with the base station.

In operation 703, the terminal may transmit mode-2 (d) function indication information to the base station. The mode-2 (d) indicator of the operation 703 may include a mode-2 (d) enabling zone indicator.

In operation 704, the terminal may search for the presence of the target terminal of mode-2 (d). The search process of the target terminal may correspond to a search procedure using a PC5-S signaling message. The PC5-S signaling message transmitted by the terminal in the search procedure corresponds to, for example, a search message, and may include at least one of a destination identifier of the target terminal, an indicator asking whether the target terminal exists, and a group identifier when the target terminal corresponds to a specific group. The terminal may receive a PC5-S signaling message (search response message) from one or more target terminals as a response to the PC5-S signaling including the information. The search response message may include at least one of an identifier of the terminal, an identifier of a target terminal, and a group identifier when the target terminal corresponds to a specific group.

In operation 704, the terminal may search for the presence of the target terminal of mode-2 (d). In operation 704, if a target terminal of mode-2 (d) is found and there is no PC5 RRC unicast connection configuration with the target terminal, a PC5 RRC unicast connection configuration procedure with the target terminal may be performed.

In operation 705, the terminal may collect mode-2 (d) information from the target terminal. The mode-2 (d) information collection in operation 705 may be performed through the PC5 RRC unicast connection. The mode-2 (d) information may include information on a V2X application for assigning/configuring sidelink radio resources to the target terminal (at least one of interest transmission frequency list, interest reception frequency list, unicast destination ID, QFI, PQI, traffic pattern information, and buffer status information).

If the assistant terminal function is not activated by the determination of operation 701, the terminal may activate the target terminal function. Target terminal function activation may be performed when at least one or a combination of the following Table 5 is satisfied.

TABLE 5

| Target terminal function activation |
|---|
| (1) Support target terminal function |
| (2) Obtain assistant terminal information (assistant terminal is detected) |
| (3) Located in mode-2 (d) enabling zone |
| (4) Execute mode-2 (d) interest V2X application |

On the other hand, the search of the assistant terminal may use the search procedure using the PC5-S signaling message of operation 704 described above. As another embodiment, as a search procedure using the PC5-S signaling message, the terminal may transmit a PC5-S signaling message for searching, and the signaling may include at least one of a destination identifier of the target terminal, an indicator asking whether the target terminal exists, an indicator indicating whether the target terminal exists, and a group identifier when the target terminal corresponds to a specific group. The terminal may receive the PC5-S signaling message corresponding to an assistant terminal search response message from one or more assistant terminals, and the assistant terminal search response message may include at least one of an identifier of the terminal, an identifier of a target terminal, and a group identifier when the target terminal corresponds to a specific group.

In operation 706, the terminal may inform the base station of the mode-2 (d) support capability and/or the mode-2 (d) target terminal function capability. The operation 706 may be omitted when the base station does not need to know the mode-2 (d) target terminal function capability and/or when the terminal is not in an RRC connection activation state with the base station.

In operation 707, the terminal may search for the assistant terminal. The presence or absence of the assistant terminal may be determined by receiving mode-2 (d) function indication information and/or mode-2 (d) enabling zone indicator transmitted from the assistant terminal. If there is no PC5 RRC unicast connection setup with the assistant terminal, the terminal may perform a PC5 RRC unicast connection setup procedure with the assistant terminal.

According to an embodiment, when one or more assistant terminals are searched, the terminal may select one assistant terminal. For example, the terminal may establish a PC5 RRC with all searched assistant terminals. For another example, the terminal may select one assistant terminal arbitrary from all the searched assistant terminals and connect to the PC5 RRC. In another example, the terminal may select an assistant terminal having the best signal strength (e.g., SL RSRP), may select an assistant terminal having the best signal strength (e.g., Uu RSRP+SL RSRP), or may select an assistant terminal having the best battery level (e.g., battery remaining).

If there is no PC5 RRC unicast connection configuration with the assistant terminal, the terminal may perform a PC5 RRC unicast connection configuration procedure with the assistant terminal.

The terminal may transmit mode-2 (d) assistance information to the assistant terminal in operation 708. The mode-2 (d) assistance information may include at least one of an interest transmission frequency list, an interest reception frequency list, a unicast destination ID, a groupcast destination ID, QFI, PQI, traffic pattern information, and buffer status information.

Referring to FIG. 7B, in operation 711, the terminal may determine whether the assistant terminal function is activated. Assistant terminal function activation may be performed when at least one or a combination of the above Table 2 is satisfied.

If the assistant terminal function is activated by the determination of operation 711, the terminal can inform the base station of the mode-2 (d) support capability and/or mode-2 (d) assistant terminal function capability in operation 712. The operation 712 may be omitted when the base station does not need to know the mode-2 (d) assistant terminal function capability and/or when the terminal is not in an RRC connection activation state with the base station.

In operation 713, the terminal may transmit mode-2 (d) function indication information to the base station. The mode-2 (d) function indication information of operation 713 may include a mode-2 (d) enabling zone indicator.

In operation 714, the terminal may search for the presence of the target terminal of mode-2 (d). The search procedure of the target terminal may correspond to a search procedure using a PC5-S signaling message. The PC5-S signaling message transmitted by the terminal in the search procedure corresponds to, for example, a search message and may include at least one of a destination identifier of the target terminal, an indicator asking whether the target terminal exists, and a group identifier when the target terminal corresponds to a specific group. The terminal may receive a PC5-S signaling message (search response message) from one or more target terminals as a response to the PC5-S signaling including the information. The search response message may include at least one of an identifier of the terminal, an identifier of a target terminal, and a group identifier when the target terminal corresponds to a specific group.

In operation 714, the terminal may search for the presence of the target terminal of mode-2 (d). In operation 714, if the target terminal of mode-2 (d) is found and there is no PC5 RRC unicast connection configuration with the target terminal, the terminal may perform the PC5 RRC unicast connection configuration procedure with the target terminal.

In operation 715, the terminal may collect mode-2 (d) information from the target terminal. The mode-2 (d) information collection in operation 715 may be performed through the PC5 RRC unicast connection. The mode-2 (d)

information may include information on a V2X application for assigning/setting sidelink radio resources to the target terminal (at least one of interest transmission frequency list, interest reception frequency list, unicast destination ID, groupcast destination ID, QFI, PQI, traffic pattern information, and buffer status information).

If the assistant terminal function is not activated by the determination of operation 711, the terminal can determine whether the target terminal function is activated. Target terminal function activation may be performed when satisfying at least one or a combination of the above Table 5.

In operation 717, the terminal may inform the base station of the mode-2 (d) support capability and/or the mode-2 (d) target terminal function capability. The operation 717 may be omitted when the base station does not need to know the mode-2 (d) target terminal function capability and/or when the terminal is not in an RRC connection activation state with the base station.

In operation 718, the terminal may search for the assistant terminal. The presence or absence of the assistant terminal may be determined by receiving a mode-2 (d) indicator and/or a mode-2 (d) enabling zone indicator transmitted by the assistant terminal. Meanwhile, the search of the assistant terminal may use the search procedure using the PC5-S signaling message of operation 714 described above. In another embodiment, as a search procedure using a PC5-S signaling message, the terminal may transmit a PC5-S signaling message for searching for an assistant terminal, and the signaling may include at least one of a destination identifier of an assistant terminal, an indicator asking whether an assistant terminal exists, an indicator indicating whether a target terminal exists, or a group identifier when the target terminal corresponds to a specific group.

The terminal may receive a PC5-S signaling message corresponding to the assistant terminal search response message from one or more assistant terminals, and the assistant terminal search response message may include at least one of a target terminal identifier, an assistant terminal identifier, and a group identifier to which the target terminal belongs. If there is no PC5 RRC unicast connection configuration with the assistant terminal, the terminal may perform a PC5 RRC unicast connection configuration procedure with the assistant terminal.

The terminal may transmit mode-2 (d) assistance information to the assistant terminal in operation 719. The mode-2 (d) assistance information may include at least one of an interest transmission frequency list, an interest reception frequency list, a unicast destination ID, a groupcast destination ID, QFI, PQI, traffic pattern information, and buffer status information. According to an embodiment, when one or more assistant terminals are searched, the terminal may select one assistant terminal. For example, the terminal may establish PC5 RRC with all searched assistant terminals. For another example, the terminal may select one assistant terminal arbitrarily from all the searched assistant terminals and connect the PC5 RRC. For another example, the terminal may select an assistant terminal having the best signal strength (e.g., SL RSRP), may select an assistant terminal having the best signal strength (e.g., Uu RSRP+SL RSRP), or may select an assistant terminal having the best battery level (e.g., battery remaining).

In the process of performing the operation 701 of FIG. 7A to operation 711 of FIG. 7B according to another embodiment of the disclosure, if it is determined that the terminal supporting the assistant terminal function is already in the vicinity in the case of supporting the assistant terminal function among the conditions of the above Table 4, the terminal may proceed to operation 706 of FIG. 7A to operation 716 of FIG. 7B without activating the assistant terminal function. The method for determining that the terminal that supports the assistant terminal function is already in the vicinity may include determining, by the terminal, that there is already a terminal supporting the assistant terminal function through the mode-2 (d) indicator and/or mode-2 (d) enabling zone indicator received from the assistant terminal.

Figure 8A:
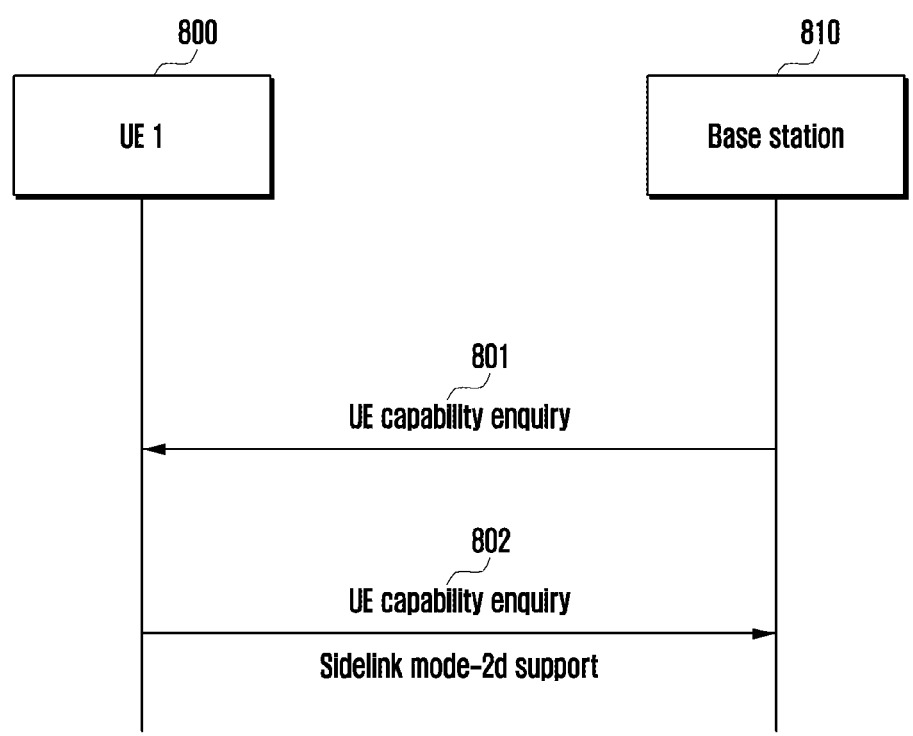
FIG. 8A illustrates a signal procedure for notifying capability information of a terminal supporting sidelink mode-2 (d) according to various embodiments of the present disclosure.
Figure 8B:
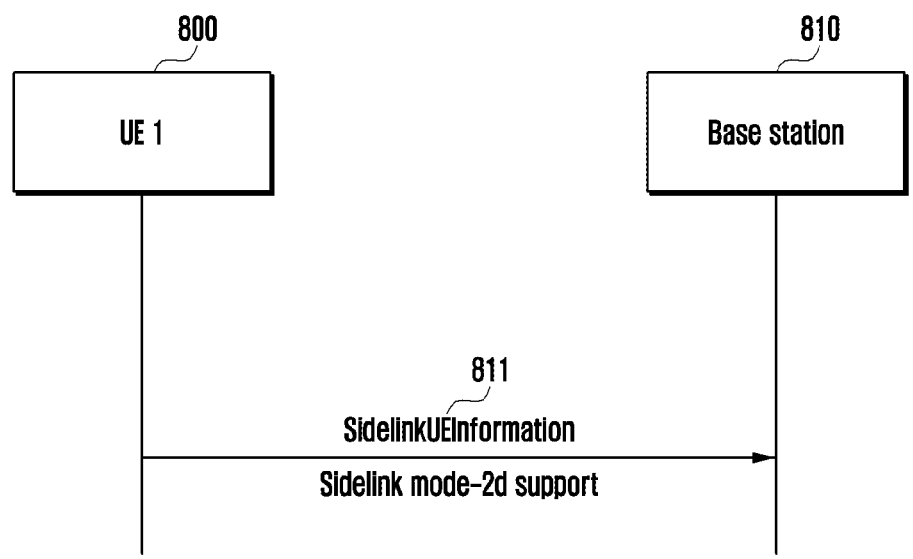
FIG. 8B illustrates a signal procedure for notifying capability information of a terminal supporting sidelink mode-2 (d) according to various embodiments of the present disclosure.
Figure 8C:
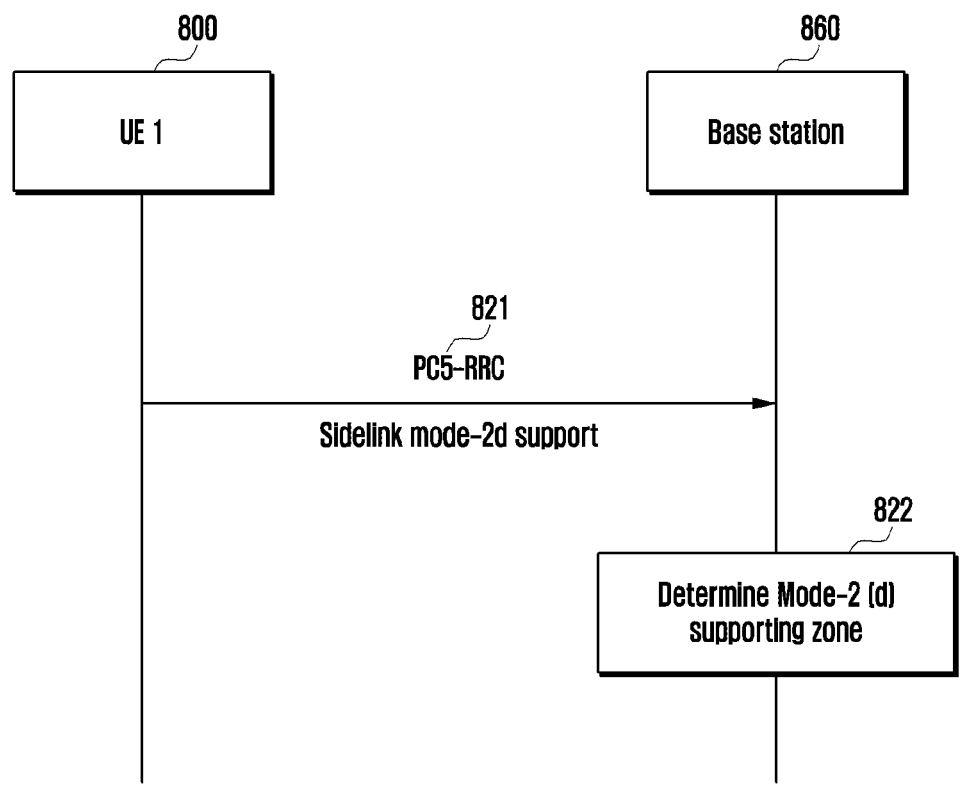
FIG. 8C illustrates a signal procedure for notifying capability information of a terminal supporting sidelink mode-2 (d) according to various embodiments of the present disclosure.

FIG. 8A illustrates a signal procedure for notifying capability information of a terminal supporting sidelink mode-2 (d) according to various embodiments, FIG. 8B illustrates a signal procedure for notifying capability information of a terminal supporting sidelink mode-2 (d) according to various embodiments, and FIG. 8C illustrates a signal procedure for notifying capability information of a terminal supporting sidelink mode-2 (d) according to various embodiments.

Referring to FIG. 8A, a terminal 800 has an RRC connection configuration with a base station 810, if the terminal 800 receives the UE capability enquiry message of operation 801 from the base station 810. The terminal 800 may transmit the sidelink mode-2 (d) function support capability to the base station 810 through a UE capability information message in operation 802. The sidelink mode-2 (d) capability support capability information included in the UE capability information message may include at least one of mode-2 (d) capability indication information, mode-2 (d) assistant terminal information, and mode-2 (d) target terminal information.

According to another embodiment of the disclosure, the UE capability information message including the sidelink mode-2 (d) capability support capability information may be transmitted without receiving the UE capability enquiry message of operation 801.

Referring to FIG. 8B, when the terminal 800 has an RRC connection configuration with the base station 810, the terminal 800 may transmit the sidelink mode-2 (d) function support capability to the base station 810 via at least one of a SidelinkUEinformation message, an UEAssistanceInformation message, or an SLMode-2dAssistanceInformation message in operation 811. The sidelink mode-2 (d) function support capability information may include at least one of mode-2 (d) function indication information, mode-2 (d) assistant terminal information, mode-2 (d) target terminal information, and mode-2 (d) assistance information. The mode-2 (d) assistance information may be included when the assistant terminal transmits the sidelink mode-2 (d) function support capability information to the base station, and may not be included when the target terminal transmits sidelink mode-2 (d) function support capability information to the base station.

The mode-2 (d) assistance information may include at least one of a transmission frequency list of interest, a reception frequency list of interest, a unicast destination ID, a groupcast destination ID, QFI, PQI, traffic pattern information, and buffer status information. The terminal 800 may transmit only the mode-2 (d) assistance information to the base station 810 in at least one of the SidelinkUEInformation message, the UEAssistanceInformation message, or SLMode2dAssistanceInformation message, and when the base station 810 receives the mode-2 (d) assistance information, the base station 810 may recognize that the terminal 800 is an assistant terminal having mode-2 (d) function capability.

The procedure of FIGS. 8A to 8B may correspond to operation 702 of FIG. 7A to operation 712 of FIG. 7B for exchanging capability information between the assistant terminal and the base station. The procedure of FIGS. 8A to 8B may correspond to operation 706 of FIG. 7A to operation 717 of FIG. 7B for exchanging capability information between the target terminal and the base station.

Referring to FIG. 8C, when UE1 800 activates the assistant terminal function, the UE1 800 may transmit mode-2 (d) function indication information and/or mode-2 (d) enabling zone indicator information to the UE2 860, in operation 821. The information of operation 821 may be transmitted via at least one of a PC5-RRC unicast control signal, a PC5-RRC groupcast control signal, and a PC5-RRC broadcast control signal. The control signals may be transmitted via at least one of an AS configuration message, a UE capability message, SL V2X MIB, SL V2X SIB, PSCCH SCI, and PC5 MAC CE. As another embodiment of the disclosure, the information of operation 821 may be included in a V2X application message to be transmitted. In operation 821, the UE2 860 received the information transmitted by the UE1 800 may recognize mode-2 (d) enabling zone and/or recognize that the UE1 800 is an assistant terminal support the mode-2 (d) function, in operation 822.

A procedure in which the UE1 800 performs a role of an assistant terminal for supporting the mode-2 (d) function of the UE2 860 will be described with reference to FIGS. 9A to 9E. In addition, when the UE2 860 activates the mode-2 (d) function in operation 822, the UE2 860 may notify the UE1 800 of the mode-2 (d) function support notification and/or the mode-2 (d) function interest. The procedure will be described with reference to FIGS. 9B to 9E.

Figure 9A:
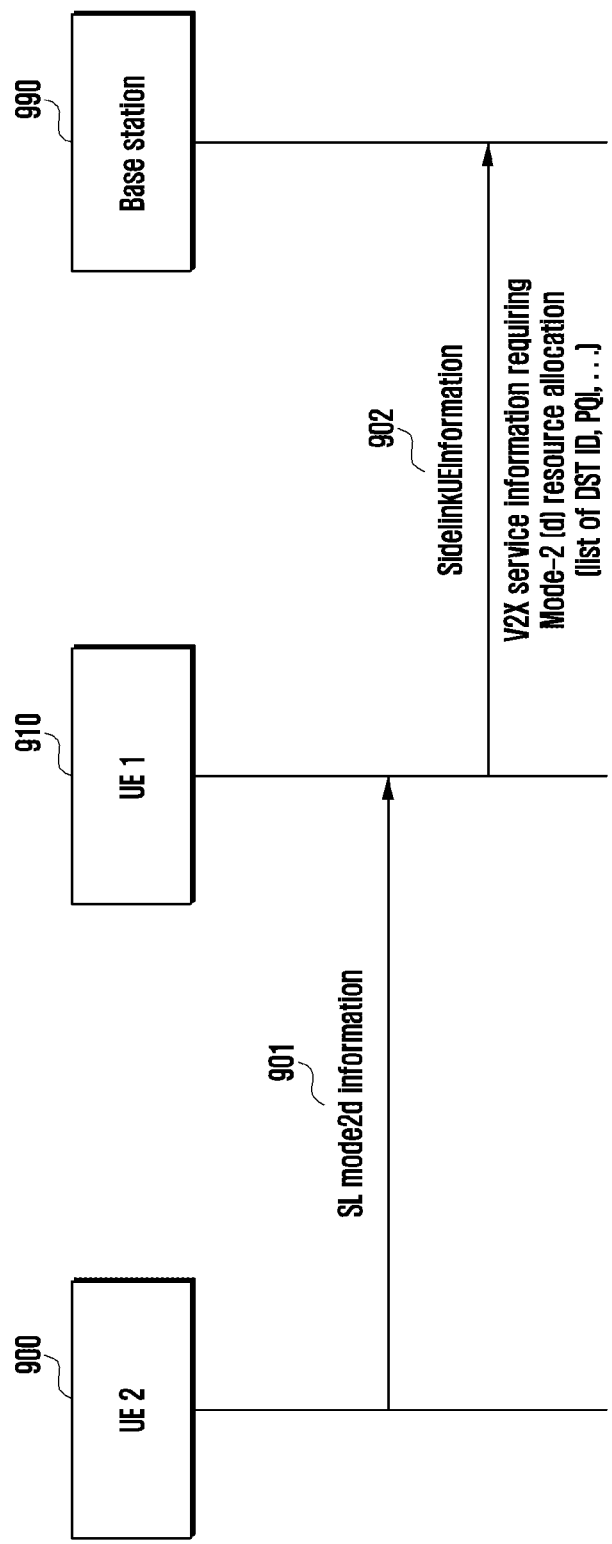
FIG. 9A illustrates a signaling procedure for acquiring information required for sidelink resource allocation according to various embodiments of the present disclosure.
Figure 9B:
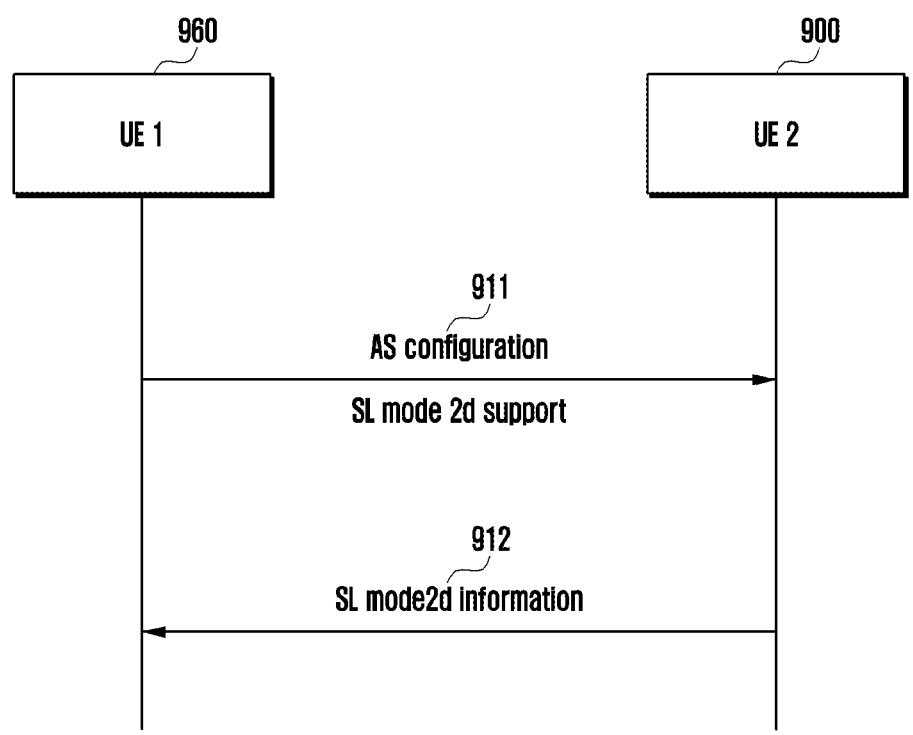
FIG. 9B illustrates a signaling procedure for acquiring information required for sidelink resource allocation according to various embodiments of the present disclosure.
Figure 9C:
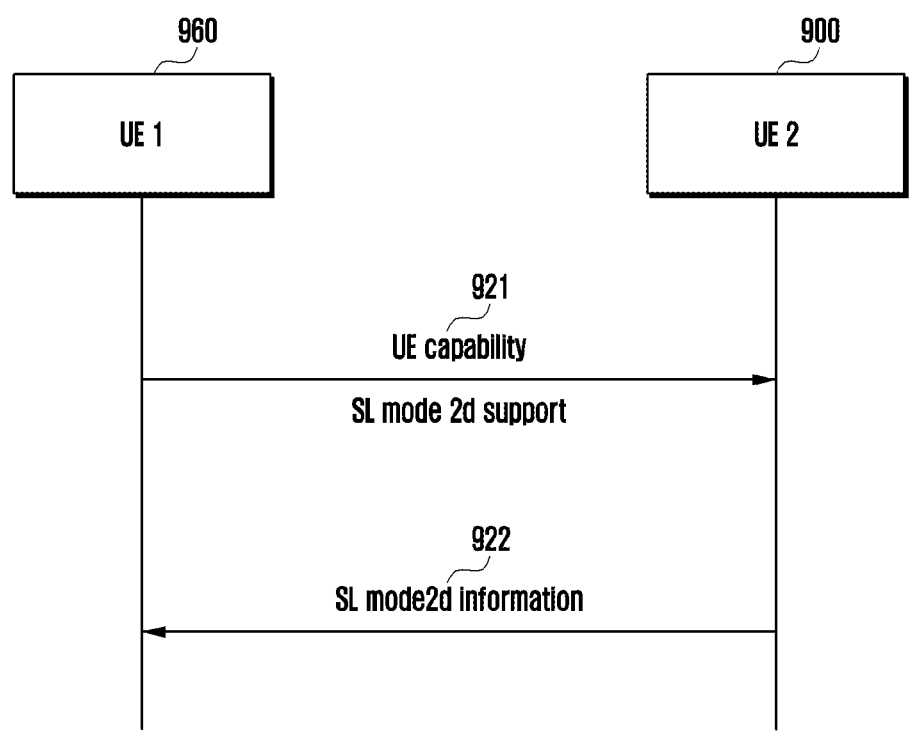
FIG. 9C illustrates a signaling procedure for acquiring information required for sidelink resource allocation according to various embodiments of the present disclosure.
Figure 9D:
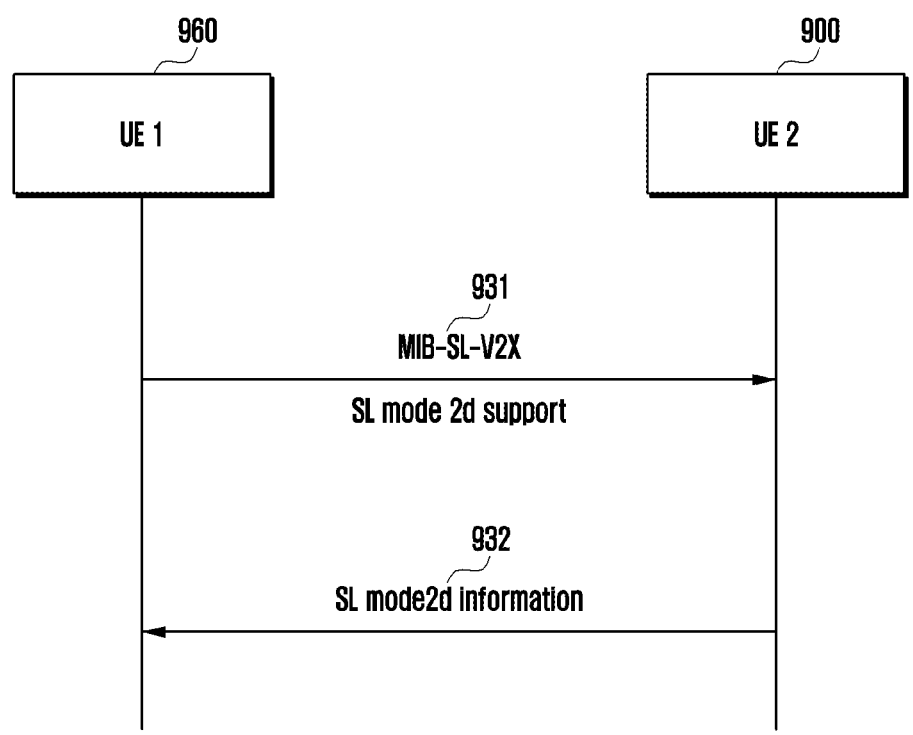
FIG. 9D illustrates a signaling procedure for acquiring information required for sidelink resource allocation according to various embodiments of the present disclosure.
Figure 9E:
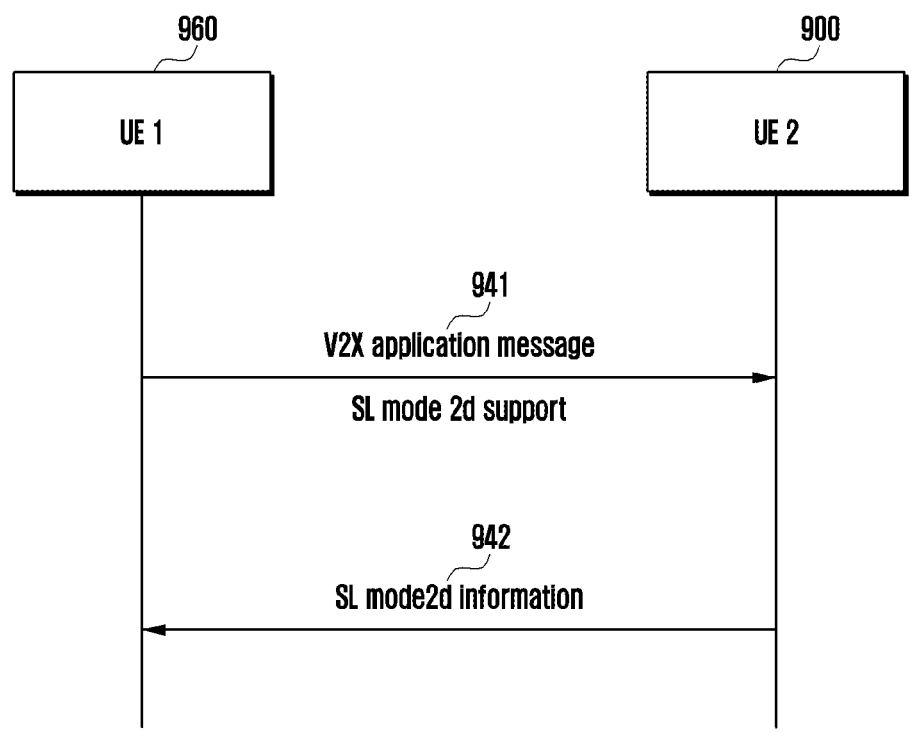
FIG. 9E illustrates a signaling procedure for acquiring information required for sidelink resource allocation according to various embodiments of the present disclosure.

FIG. 9A illustrates a signaling procedure for acquiring information required for sidelink resource allocation according to various embodiments of the present disclosure. FIG. 9B illustrates a signaling procedure for acquiring information required for sidelink resource allocation according to various embodiments of the present disclosure. FIG. 9C illustrates a signaling procedure for acquiring information required for sidelink resource allocation according to various embodiments of the present disclosure. FIG. 9D illustrates a signaling procedure for acquiring information required for sidelink resource allocation according to various embodiments of the present disclosure. FIG. 9E illustrates a signaling procedure for acquiring information required for sidelink resource allocation according to various embodiments.

Referring to FIG. 9A, when an UE2 900 activates the mode-2 (d) function, the UE2 900 may notify an UE1 960 of the mode-2 (d) function support notification and/or the mode-2 (d) function interest in operation 901. The operation of operation 901 may be performed when the UE2 900 receives a mode-2 (d) function support notification and/or mode-2 (d) function interest notification from the UE1 960 according to the procedure of at least one of FIGS. 9B to 9E, and it is determined that the UE1 960 performs a role of a terminal that assists in sidelink radio resource allocation and/or configuration. The SL mode-2 (d) information message transmitted in operation 901 may be transmitted via PC5 RRC unicast connection between the UE1 960 and the UE2 900.

The information included in the SL mode-2 (d) information message may include at least one of the following: destination ID (DST ID) corresponding to application; cast type indicator when DST ID is not classified by cast type; interested frequency info corresponding to DST ID; PQI information; traffic pattern information (packet transmission period, packet size, priority information, packet transmission offset) when sidelink radio resource allocation of configured grant type is required; terminal identifier (e.g., V2X-RNTI); and serving cell info (when it is necessary to distinguish the terminal receiving from another base station).

An example of an ASN.1 structure in the case of including a cast type indicator for distinguishing a cast type corresponding to a DST ID according to various embodiments of the disclosure is shown in Table 6 below.

TABLE 6

| ASN.1 structure for a cast type indicator |
| --- |
| SL-V2X-CommTxResourceReq ::= SEQUENCE {<br>    carrierFreqCommTx      INTEGER (0.. maxFreqV2X-1), OPTIONAL<br>    v2x-DestinationInfoList    SL-DestinationInfoList OPTIONAL<br>}<br>SL-DestinationInfoList ::= SEQUENCE (SIZE (1..maxSL-Dest)) OF SL-DestinationIdentity<br>    SL-DestinationIdentity ::= SEQUENCE {<br>        v2x-DestinationIdentity    BIT STRING (SIZE (24)),<br>        v2x-CastType    ENUMERATED {unicast, groupcast, broadcast}<br>    } |

Upon receiving the information of operation 901, the UE1 960 may configure mode-2 (d) assistance information, based on the information included in the SL mode2d information message and transmit the information to the base station 990. The mode-2 (d) assistance information may include information of one or more target terminals to which the UE1 960 assists mode-2 (d) function assistance in addition to the UE2 900.

The mode-2 (d) assistance information transmitted in operation 902 may include at least one of an interest transmission frequency list, an interest reception frequency list, a unicast destination ID, a groupcast destination ID, QFI, PQI, traffic pattern information, and buffer status information. The UE1 960 may include the mode-2 (d) assistance information in at least one of a SidelinkUEInformation message, an UEAssistanceInformation message, or an SLMode2dAssistanceInformation message to the base station 990.

Referring to FIG. 9B, the UE1 960 may transmit an AS configuration message including mode-2 (d) function indication information and/or mode-2 (d) enabling zone indicator to the UE2 900 in operation 911. The UE2 900 may transmit an SL mode2d information message including mode-2 (d) function assistance notification and/or mode-2 (d) function interest information to the UE1 960 in operation 912.

Referring to FIG. 9C, the UE1 960 may transmit a UE capability message including mode-2 (d) function indication information and/or mode-2 (d) enabling zone indicator to the UE2 900 in operation 921. The UE2 900 may transmit an SL mode2d information message including mode-2 (d) function assistance notification and/or mode-2 (d) function interest information to the UE1 960 in operation 922.

Referring to FIG. 9D, the UE1 960 may transmit an MIB-SLV2X message including mode-2 (d) function indication information and/or mode-2 (d) enabling zone indicator to the UE2 900 in operation 931. The UE2 900 may transmit an SL mode2d information message including mode-2 (d) function assistance notification and/or mode-2 (d) function interest information to the UE1 960 in operation 932.

Referring to FIG. 9E, the UE1 960 may transmit a V2X application message including mode-2 (d) function indication information and/or mode-2 (d) enabling zone indicator to the UE2 900 in operation 941. The UE2 900 may transmit an SL mode2d information message including mode-2 (d) function assistance notification and/or mode-2 (d) function interest information to the UE1 960 in operation 942.

Figure 10A:
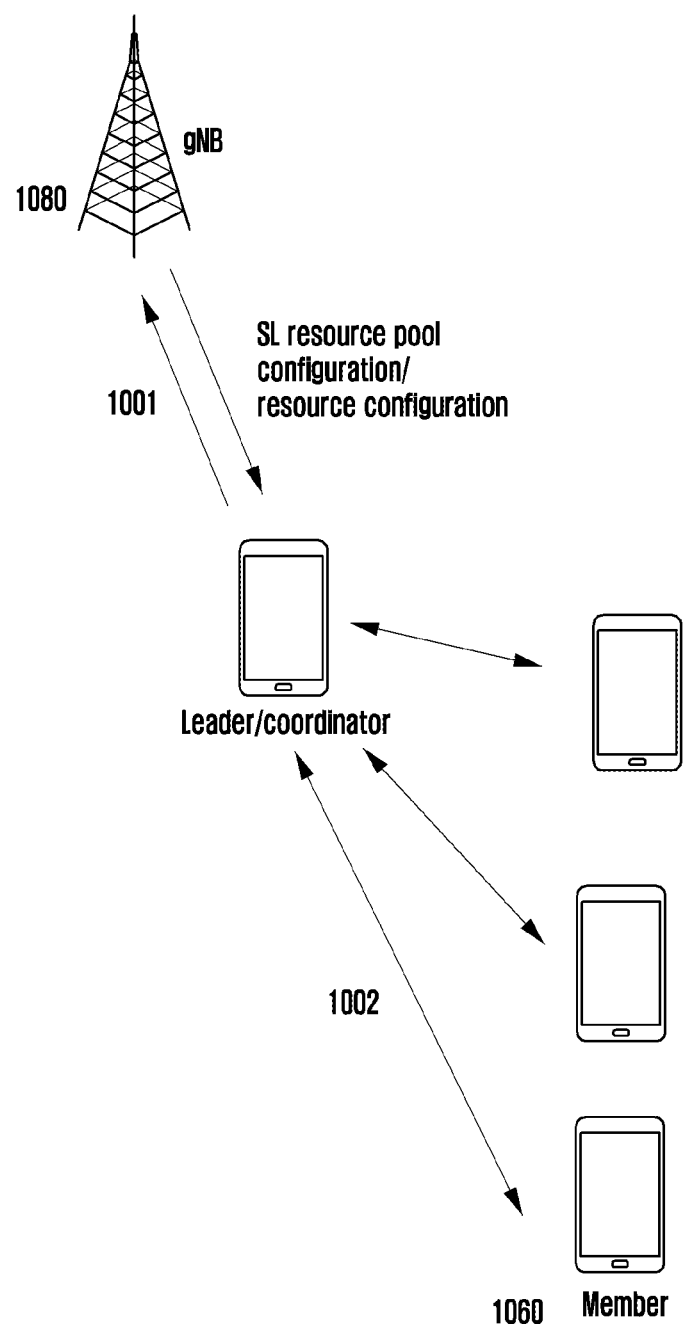
FIG. 10A illustrates a signaling procedure for configuring sidelink resource allocation information according to various embodiments of the present disclosure.
Figure 10B:
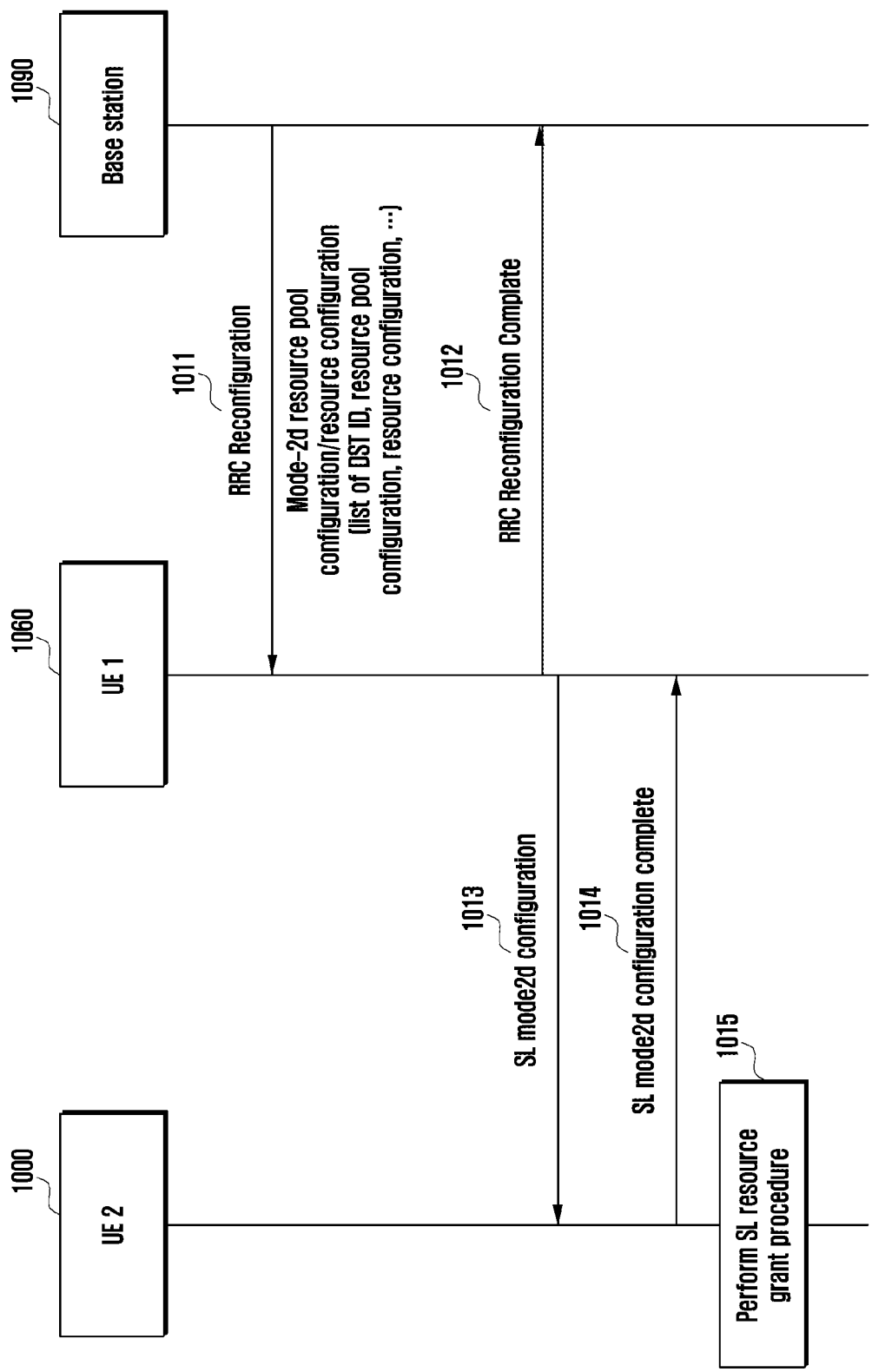
FIG. 10B illustrates a signaling procedure for configuring sidelink resource allocation information according to various embodiments of the present disclosure.

FIG. 10A illustrates a signaling procedure for configuring sidelink resource allocation information according to various embodiments of the present disclosure. FIG. 10B illustrates a signaling procedure for configuring sidelink resource allocation information according to various embodiments of the present disclosure.

Referring to FIG. 10A, a base station 1080 may configure sidelink radio resource allocation and/or configuration of one or more target terminals 1060, based on mode-2 (d) assistance information of the target terminal 1060, collected through an assistant terminal 1000, in operation 1001. The mode-2 (d) assistance information collected through the assistant terminal 1000 may include information transmitted in operation 902 of FIG. 9A.

The base station 1080 may provide the configured sidelink radio resource allocation and/or configuration information of one or more target terminals 1060 to one or more target terminals 1060 through the assistant terminal 1000, in operation 1002. The sidelink radio resource allocation and/or configuration information is a sidelink radio resource allocated to the target terminal 1060 or resource configuration information to be used by the target terminal 1060 to request a sidelink radio resource from the base station 1080, may include at least one of resource configuration information used by the target terminal 1060 to directly allocate a sidelink radio resource. The detailed procedure of FIG. 10A will be described with reference to FIG. 10B.

Referring to FIG. 10B, the base station 1080 may transmit an RRC reconfiguration message including sidelink radio resource allocation and/or configuration information for one or more target terminals 1060 to the assistant terminal 1000 in operation 1011. The information transmitted in operation 1011 may include at least one of a destination ID list, sidelink radio resource pool information, sidelink radio resource allocation information, configuration information required for sidelink radio resource request, mode 1 allocation and/or mode 2 allocation information, sidelink feedback transmission resource configuration information for providing radio resource allocation and/or configuration information for each target terminal 1060.

The mode 1 allocation information may include at least one of configured grant type 1 to configured grant type 2 to dynamic grant. The mode 2 allocation information may include at least one of a sidelink radio resource pool and sidelink radio resource sensing configuration information. The assistant terminal 1000 may transmit an RRC configuration complete message to the base station 1080 in operation 1012, in response to the RRC configuration message. The assistant terminal 1000 may transmit an SL mode2d configuration message including sidelink radio resource allocation and/or configuration information for one or more target terminals 1060, received in the RRC configuration message to the target terminal 1060 in operation 1013. One or more target terminals 1060 may transmit an SL mode2d configuration complete message to the assistant terminal 1000 in operation 1014 in response to the SL mode2d configuration message. One or more target terminals 1060 may perform sidelink radio resource allocation, based on the sidelink radio resource allocation and/or configuration information received in operation 1015.

When the one or more target terminals 1060 are allocated sidelink resources from the base station 1080 (which may include packet transmission resources and HARQ feedback resources), V2X packet transmission and reception may be performed using the obtained resources. When the one or more target terminal 1060 receives the mode 1 resource configuration information from the base station 1080, that is, if the resource configuration information corresponds to a case where a configuration requires for SR configuration or SL-BSR transmission is received, the target terminal 1060 may be allocated sidelink radio resources, based on the resource configuration information to perform V2X packet transmission and reception.

When the one or more target terminals 1060 receive the configuration information for the configured grant type 1 or the configuration information for the configured grant type 2 of the mode 1 resource configuration information from the base station 1080, the target terminal 1060 may be allocated sidelink radio resource, based on the configured grant type 1 configuration information or the configured grant type 2 configuration information to perform the V2X packet transmission and reception. When the one or more target terminals 1060 receive mode2 resource configuration information, that is, sidelink radio resource pool or sensing configuration information from the base station 1080, the target terminal 1060 may be allocated sidelink radio resource, based on the resource configuration information by itself to perform V2X packet transmission and reception. In the embodiment of FIG. 10B, the target terminal 1060 may or may not configure an RRC connection with the base station 1080.

Next, a method of processing HARQ feedback in a system supporting mode-2 (d) according to various embodiments of the disclosure will be described. There may be a case where HARQ feedback is designated to be transmitted for each V2X application required by each target terminal and a case where it is designated that HARQ feedback does not need to be transmitted. For the case where HARQ feedback is designated to be transmitted, the base station may allocate HARQ feedback transmission resource or configure configuration information on the HARQ feedback transmission resource. As an embodiment, the assistant terminal may include HARQ feedback enabled/disabled indication information on the service of each target terminal in mode-2 (d) assistance information of one or more target terminals to the base station. The base station may configure HARQ feedback transmission resource allocation and/or configuration information for the service of each target terminal, based on the HARQ feedback enabled/disabled indication information for the service of each target terminal.

As another embodiment, the assistant terminal may not separately include HARQ feedback information for the service of each target terminal when transferring mode-2 (d) assistance information of one or more target terminals to the base station. The base station may configure sidelink resource allocation and/or configuration information for the service of each target terminal regardless of HARQ feedback. In this case, when the cast type corresponding to the service of each target terminal is configured as unicast or groupcast, the base station may configure HARQ feedback transmission resource allocation and/or configuration information, based on this. Each target terminal may determine the HARQ feedback resource, based on the transmission resource allocation and/or configuration information configured by the base station.

For example, when the base station provides HARQ feedback transmission resource allocation and/or configuration information for unicast or groupcast, the target terminal may be allocated HARQ feedback transmission resource, based on the information. For another example, when the base station does not provide HARQ feedback transmission resource allocation and/or configuration information, the target terminal may allocate HARQ feedback transmission resources by itself. For another example, when the base station does not provide HARQ feedback transmission resource allocation and/or configuration information, the target terminal may be allocated HARQ feedback transmission resource by applying the same packet transmission resource allocation and/or configuration information corresponding to the service. For another example, when the base station does not provide HARQ feedback transmission resource allocation and/or configuration information, the target terminal may be allocated HARQ feedback transmission resources, based on a predefined HARQ feedback transmission resource.

According to various embodiments of the disclosure, a method for distinguishing a sidelink resource allocation request for transmitting a PC5 RRC control message from a sidelink resource allocation request for transmitting a PC5 data message will be described. For example, when a base station operates a mode for allocating sidelink radio resources according to the conventional method, there is no way to distinguish resource requests for PC5 RRC control message transmission and resource requests for PC5 data message transmission. Thus, it is not possible to support transmission differentiation of the control message and the data message, and there is no way to distinguish the control message or the data message that needs to be transmitted first.

The method of distinguishing the PC5 RRC control message and the PC5 data message, provided by the disclosure may be at least one or a combination of the following: (1) define PC5-RRC control message indicator/PC5 data message indicator separately; (2) define by distinguishing PQI value corresponding to PC5-RRC control message and PQI value corresponding to PC5 data message; (3) define by distinguishing QFI value corresponding to PC5-RRC control message and QFI value corresponding to PC5 data message; (4) define by distinguishing priority value corresponding to PC5-RRC control message and priority value corresponding to PC5 data message; (5) define by distinguishing destination ID corresponding to PC5-RRC control message and destination ID corresponding to PC5 data message; (6) a message including a sidelink radio resource allocation request corresponding to a PC5-RRC control message does not include a destination ID, and a message including a sidelink radio resource allocation request corresponding to a PC5 data message includes a destination ID (e.g., for a PC5 data message if a SidelinkUEInformation message contains a DST ID, or for a PC5 RRC control message if the SidelinkUEInformation message does not include a DST ID); and (7) define by distinguishing SR (scheduling request) configuration for PC5 RRC control message transmission and SR configuration for PC5 data message transmission.

Table 7 shows various examples of ASN.1 structure for scheme (1).

TABLE 7

| ASN.1 structure for scheme (1) |
| --- |
| SL-V2X-CommTxResourceReq ::=  SEQUENCE {<br>    carrierFreqCommTx  INTEGER (0.. maxFreqV2X−1), OPTIONAL<br>    v2x-DestinationInfoList  SL-DestinationInfoList,<br>    v2x-ControlDataInfo ENUMERATED {PC5 control, PC5 data}<br>}<br>SL-V2X-CommTxResourceReq ::=  SEQUENCE {<br>    carrierFreqCommTx  INTEGER (0.. maxFreqV2X−1), OPTIONAL<br>    v2x-DestinationInfoList  SL-DestinationInfoList,<br>    v2x-ControlIndicator  BOOLEAN<br>}<br>SL-V2X-CommTxResourceReq ::=  SEQUENCE {<br>    carrierFreqCommTX  INTEGER (0.. maxFreqV2X−1, OPTIONAL<br>    v2x-DestinationInfoList  SL-DestinationInfoList,<br>    v2x-ControlIndicator  ENUMERATED {true}<br>} |

Table 8 shows an example of ASN.1 structure for scheme (6).

TABLE 8

| ASN.1 structure for scheme (6) |
| --- |
| SL-V2X-CommTxResourceReq ::=  SEQUENCE {<br>    carrierFreqCommTx  INTEGER (0.. maxFreqV2X−1), OPTIONAL<br>    v2x-DestinationInfoList  SL-DestinationInfoList OPTIONAL<br>} |

An operation of a terminal and a base station processing sidelink radio resource allocation for a PC5 RRC control message and a PC5 data message according to various embodiments of the disclosure will be described.

In one embodiment, the case of operating the base station scheduling mode (mode 1) is provided (e.g., scheme 1).

When a terminal requests a sidelink radio resource for transmitting a PC5 RRC control message or a PC5 data message, the terminal may transmit a sidelink radio resource allocation request message to the base station using at least one or a combination of the above methods (1) to (6).

The base station that has received the sidelink radio resource request in at least one or a combination of the methods (1) to (6) from the terminal may separately allocate the SR configuration for the PC5 RRC control message and the SR configuration for the PC5 data message, as in the method (7). The base station that has received the sidelink radio resource request in at least one or a combination of the methods (1) to (6) from the terminal may separately allocate the SL resource pool for the PC5 RRC control message and the SL resource pool for the PC5 data message.

According to another embodiment of the disclosure, the base station may preconfigure SR configuration for a PC5 RRC control message to a terminal supporting PC5 unicast without receiving a separate request from the terminal.

According to another embodiment of the disclosure, the base station may separately allocate the SL resource pool for the PC5 RRC control message and the SL resource pool for the PC5 data message without receiving a separate request from the terminal.

According to another embodiment of the disclosure, the base station may separately allocate a Uu SR configuration for message transmission triggering a sidelink radio resource request for a PC5 RRC control message and a Uu SR configuration for message transmission triggering a sidelink radio resource request for a PC5 data message. For example, an SR configuration transmitting a SidelinkUEInformation message including information on a PC5 RRC control message and an SR configuration transmitting a SidelinkUE-Information message including information on a PC5 data message may be distinguished.

When the terminal has enough space in a sidelink radio resource allocated for PC5 RRC control message transmission, the terminal may transmit a PC5 data message. On the contrary, when the terminal has enough space in a sidelink radio resource allocated for PC5 data message transmission, the terminal may transmit a PC5 RRC control message.

In one embodiment, the case of operating a direct terminal allocation mode (mode 2) is provided (e.g., scheme 2).

According to an embodiment of the disclosure, the sidelink radio resource pool for transmitting the PC5 RRC control message and the sidelink radio resource pool for transmitting the PC5 data message may be separately operated.

According to another embodiment of the disclosure, if there is no division in the sidelink radio resource pool, the terminal may preferentially allocate a resource for transmitting the PC5 RRC control message.

According to another embodiment of the disclosure, if there is no division in the sidelink radio resource pool, the terminal may preferentially allocate resources when the priority value of the PC5 data message is greater than or equal to the priority threshold.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the internet, intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a terminal in a wireless communication system, the method comprising:
   determining whether a mode-2 (d) sidelink wireless communication is configured based on at least one predetermined condition;
   determining whether an assistant terminal function is activated in case that the mode-2 (d) sidelink wireless communication is configured;
   identifying at least one target terminal in case that the assistant terminal function is activated; and
   receiving, from the identified target terminal, information on the mode-2 (d) sidelink wireless communication.

2. The method of claim 1, wherein the at least one predetermined condition comprises at least one of a case where the terminal is located in the mode-2 (d) sidelink wireless communication enabling zone, a case where an application related to the mode-2 (d) sidelink wireless communication is executed, or a case where information for the mode-2 (d) sidelink wireless communication is received from a base station.

3. The method of claim 1, wherein that the mode-2 (d) sidelink wireless communication is configured is determined and the assistant terminal function is activated, in case that the terminal is a terminal supporting the assistant terminal function and in case that the at least one predetermined condition is determined to be satisfied.

4. The method of claim 1, further comprising:
determining whether the target terminal function is activated in case that the assistant terminal function is not activated;
searching for at least one assistant terminal in case that the target terminal function is activated;
selecting one assistant terminal based on at least one of signal strength or battery level information; and
transmitting, to the selected assistance terminal, the mode-2 (d) sidelink wireless communication assistance information in case that a plurality of searched assistant terminals is identified.

5. The method of claim 4, further comprising transmitting, to a base station, at least one of a mode-2 (d) sidelink wireless communication assistance capability or a target terminal function capability for the mode-2 (d) sidelink wireless communication in case that the target terminal function is activated.

6. The method of claim 1, further comprising transmitting, to a base station, at least one of a mode-2 (d) sidelink wireless communication assistance capability or a target terminal function capability for the mode-2 (d) sidelink wireless communication in case that the assistant terminal function is activated.

7. The method of claim 1, further comprising:
transmitting, to a base station, information on the mode-2 (d) sidelink wireless communication received from the target terminal in case that the assistant terminal function is activated;
receiving, from the base station, resource configuration information on the mode-2 (d) sidelink wireless communication for the target terminal; and
transmitting, to the target terminal, the received resource configuration information on the mode-2 (d) sidelink wireless communication for the target terminal.

8. A terminal in a wireless communication system, the terminal comprising:
a transceiver; and
a controller configured to:
determine whether a mode-2 (d) sidelink wireless communication is configured based on at least one predetermined condition;
determine whether an assistant terminal function is activated in case that the mode-2 (d) sidelink wireless communication is configured; and
identify at least one target terminal in case that the assistant terminal function is activated; and
receive, from the identified target terminal via the transceiver, information on the mode-2 (d) sidelink wireless communication.

9. The terminal of claim 8, wherein the at least one predetermined condition comprises at least one of a case where the terminal is located in a mode-2 (d) sidelink wireless communication enabling zone, a case where an application related to the mode-2 (d) sidelink wireless communication is executed, or a case where information for the mode-2 (d) sidelink wireless communication is received from a base station.

10. The terminal of claim 8, wherein the controller determines that the mode-2 (d) sidelink wireless communication is configured and controls to activate the assistant terminal function, in case that the terminal is a terminal supporting the assistant terminal function and the predetermined at least one condition is determined to be satisfied.

11. The terminal of claim 8, wherein:
the controller is further configured to:
determine whether the target terminal function is activated in case that the assistant terminal function is not activated;
search for at least one assistant terminal in case that the target terminal function is activated;
select one assistant terminal, based on at least one of signal strength or battery level information in case that a plurality of searched assistant terminals is identified; and
transmit, to the selected assistant terminal via the transceiver, the mode-2 (d) sidelink wireless communication assistance information.

12. The terminal of claim 11, wherein the controller controls the transceiver to transmit at least one of the mode-2 (d) sidelink wireless communication assisting capability and a target terminal function capability for the mode-2 (d) sidelink wireless communication to a base station, in case that the target terminal function is activated.

13. The terminal of claim 8, wherein the controller controls the transceiver to transmit, to a base station, at least one of a mode-2 (d) sidelink wireless communication assisting capability and a target terminal function capability for the mode-2 (d) sidelink wireless communication in case that the assistant terminal function is activated.

14. The terminal of claim 8, wherein the controller controls the transceiver to:
transmit, to a base station, information on the mode-2 (d) sidelink wireless communication received from the target terminal in case that the assistant terminal function is activated;
receive, from the base station, resource configuration information on the mode-2 (d) sidelink wireless communication for the target terminal; and
transmit, to the target terminal, the received resource configuration information on the mode-2 (d) sidelink wireless communication for the target terminal.

* * * * *